US008520594B2

(12) United States Patent
Gupta et al.

(10) Patent No.: US 8,520,594 B2
(45) Date of Patent: Aug. 27, 2013

(54) SELECTIVELY INCLUDING ALLOWED CLOSED SUBSCRIBER GROUP LIST IN PAGE MESSAGE

(75) Inventors: Rajarshi Gupta, Santa Clara, CA (US); Parag A. Agashe, San Diego, CA (US); Gavin B. Horn, La Jolla, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 12/695,052

(22) Filed: Jan. 27, 2010

(65) Prior Publication Data
US 2010/0195573 A1    Aug. 5, 2010

Related U.S. Application Data

(60) Provisional application No. 61/148,785, filed on Jan. 30, 2009, provisional application No. 61/149,258, filed on Feb. 2, 2009, provisional application No. 61/157,853, filed on Mar. 5, 2009, provisional application No. 61/160,954, filed on Mar. 17, 2009.

(51) Int. Cl.
*H04W 4/00*       (2009.01)
*H04W 68/00*      (2009.01)

(52) U.S. Cl.
USPC .......................................... 370/328; 455/458

(58) Field of Classification Search
USPC ........................................ 370/252, 328, 338
See application file for complete search history.

(56) References Cited

U.S. PATENT DOCUMENTS

| 8,027,687 | B2 | 9/2011 | Jung et al. |
| 2004/0203767 | A1 | 10/2004 | Fraser et al. |
| 2006/0121899 | A1 | 6/2006 | Willey et al. |
| 2006/0189272 | A1 | 8/2006 | Willenegger et al. |
| 2007/0105568 | A1* | 5/2007 | Nylander et al. ............. 455/458 |

(Continued)

FOREIGN PATENT DOCUMENTS

| EP | 1278387 A2 | 1/2003 |
| WO | WO2008112161 | 2/2009 |

OTHER PUBLICATIONS

3GPP TS 36.300 v8.7.0, TSG RAN Evolved Universal Terrestrial Radio Access (E-UTRA) and Evolved Universal Terrestrial Radio Access Network (E-UTRAN), Overall Description, Stage 2 Release 8.

(Continued)

*Primary Examiner* — Farah Faroul
(74) *Attorney, Agent, or Firm* — François A. Pelaez

(57) ABSTRACT

Problems caused by interaction between paging optimization and synchronizing closed subscriber group (CSG) information are mitigated by setting a network indication indicating, for example, that a subscriber is no longer a member of a CSG, but the network has not yet received confirmation that an access terminal associated with the subscriber has been informed of this. A timer-based scheme may be employed for removing a CSG identifier (ID) from the subscriber information for a subscriber once it is determined that the subscriber is no longer a member of the CSG. In addition, a temporary member of a CSG may determine whether it is still a member of a CSG upon expiration of a CSG timer. Also, the frequency with which an access terminal registers may be changed based on various criteria. Furthermore, an allowed CSG list may be selectively included in a page message depending on the destination of the page message.

11 Claims, 27 Drawing Sheets

(56) References Cited

U.S. PATENT DOCUMENTS

| | | | |
|---|---|---|---|
| 2008/0133762 A1 | 6/2008 | Edge et al. | |
| 2008/0267153 A1 | 10/2008 | Mukherjee et al. | |
| 2009/0047968 A1 | 2/2009 | Gunnarsson et al. | |
| 2009/0070694 A1 | 3/2009 | Ore et al. | |
| 2009/0104905 A1* | 4/2009 | DiGirolamo et al. | 455/434 |
| 2009/0168727 A1* | 7/2009 | Somasundaram et al. | 370/332 |
| 2009/0264126 A1 | 10/2009 | Khetawat et al. | |
| 2009/0270092 A1 | 10/2009 | Buckley et al. | |
| 2010/0029274 A1 | 2/2010 | Deshpande et al. | |
| 2010/0069119 A1* | 3/2010 | Mueck et al. | 455/561 |
| 2010/0075698 A1* | 3/2010 | Rune et al. | 455/458 |
| 2010/0110945 A1 | 5/2010 | Koskela et al. | |
| 2010/0197285 A1 | 8/2010 | Horn et al. | |
| 2010/0197307 A1 | 8/2010 | Horn et al. | |
| 2010/0298017 A1 | 11/2010 | Dalsgaard et al. | |
| 2011/0122822 A1* | 5/2011 | Wu et al. | 370/328 |
| 2011/0143783 A1* | 6/2011 | Lee et al. | 455/458 |
| 2011/0165878 A1* | 7/2011 | Nylander et al. | 455/436 |
| 2011/0179168 A1 | 7/2011 | Nylander et al. | |
| 2011/0183647 A1 | 7/2011 | Dalsgaard et al. | |
| 2011/0223887 A1 | 9/2011 | Rune et al. | |
| 2011/0269465 A1* | 11/2011 | Xu et al. | 455/436 |
| 2011/0269468 A1 | 11/2011 | Sundell et al. | |
| 2011/0281584 A1* | 11/2011 | Sander et al. | 455/436 |
| 2012/0015681 A1* | 1/2012 | Dalsgaard et al. | 455/517 |
| 2012/0026975 A1* | 2/2012 | Wu | 370/331 |
| 2012/0039213 A1* | 2/2012 | Cheng et al. | 370/254 |
| 2012/0039250 A1* | 2/2012 | Li et al. | 370/328 |
| 2012/0064889 A1* | 3/2012 | Tiwari | 455/434 |
| 2012/0064900 A1* | 3/2012 | Thadasina et al. | 455/436 |
| 2012/0076121 A1* | 3/2012 | Choi et al. | 370/338 |
| 2012/0083273 A1* | 4/2012 | Mukherjee et al. | 455/436 |
| 2012/0094674 A1* | 4/2012 | Wu | 455/437 |
| 2012/0094681 A1* | 4/2012 | Freda et al. | 455/452.1 |
| 2012/0108244 A1* | 5/2012 | Shi et al. | 455/438 |
| 2012/0115474 A1* | 5/2012 | Lee et al. | 455/435.1 |
| 2012/0207132 A1* | 8/2012 | Wang et al. | 370/331 |

OTHER PUBLICATIONS

3GPP TSG SA WG3 Security SA3#54: "Reply LS on "LS on Paging Optimisation Via Allowed CSG List in Paging Message for LTE"," R3-082576/S3-090118, Jan. 26, 2009, S3-090336, 3rd Generation Partnership Project (3GPP), Mobile Competence Centre ; 650, Route Des Lucioles ; F-06921 Sophia-Antipolis Cedex ; France , XP050334940 [retrieved on Jan. 26, 2009].

3GPP: "3rd Generation Partnership Project;Technical Specification Group Services and System Aspects—Architecture aspects of Home NodeB and Home eNodeB (Release 9)" 3GPP TR 23.830 VO.2.0 (Jan. 2009) Jan. 23, 2009, XP002593705 Retrieved from th.

"3rd Generation Partnership Project; Technical Specification Group Services and System Aspects; Architecture aspects of Home NodeB and Home eNodeB (Release 9)" 3GPP Standard; 3GPP TR 23.830 V.0.3.0, 3rd Generation Partnership Project (3GPP), Mobile Competence Centre ; 650, Route Des Lucioles ; F-06921 Sophia-Antipolis Cedex ; France, No. VO.3.0, Mar. 16, 2009, pp. 1-41, XP050363898 Chapter 4.2.2.1 Chapter 4.3.1.1 Chapter 6.1.4 Chapter 6.2.2.

Changes to S1AP to Support Paging Optimization and Access Control for LTE HENBs, 3GPP TSG RAN WG3 Meting #62, R3-083574, Nov. 25, 2008, pp. 1-22.

Huawei: "A method of white list management" 3GPP Draft; CI-083297, 3rd Generation Partnership Project (3GPP), Mobile Competence Centre ; 650, Route Des Lucioles ; F-06921 Sophia-Antipolis Cedex ; France, no. Budapest, Hungary; 20080811, Aug. 11, 2008, XP050308514.

Huawei: "Access Control Requirements in Rel-9" 3GPP Draft; S2-090207, 3rd Generation Partnership Project (3GPP), Mobile Competence Centre ; 650, Route Des Lucioles ; F-06921 Sophia-Antipolis Cedex ; France, no. Phoenix; 20090107, Jan. 7, 2009, XP050332785 [retrieved on Jan. 7, 2009] Chapter 1.

International Search Report and Written Opinion—PCT/US2010/022663—International Search Authority—May 12, 2010.

NSN: "LS on paging optimisation via allowed CSG list in paging message" 3GPP Draft; R3-083425, 3rd Generation Partnership Project (3GPP), Mobile Competence Centre ; 650, Route Des Lucioles; F-06921 Sophia-Antipolis Cedex ; France Nov. 13, 2008, pp. 1-1, XP002577319 Retrieved from the Internet: URL:http://ftp.3gpp.org/ftp/Specs/html-i nf o/TDocExMtg-R3-62-26800.htm> [retrieved on Apr. 12, 2004] p. 1-p. 1.

"Paging optimization for LTE HeNBs"3GPP draft; R3-083246, 3rd Generation Partnership Project (3GPP), Mobile Competence Centre; 650, Route Des Lucioles; F-06921 Sophia-Antipolis Cedex; France Nov. 5, 2008, pp. 1-3, XP002579628 Retrieved from the Internet : URL: http://www.3gpp.org/ftp/tsg_ran/WG3_1u/TSGR3_62/ docs > [retrieved on Apr. 23, 2010].

Qualcomm Europe: "Discussion paper on CSG state" 3GPP Draft; C4-090285-V5, 3rd Generation Partnership Project (3GPP), Mobile Competence Centre ; 650, Route Des Lucioles ; F-06921 Sophia-Antipolis Cedex ; France, no. San Antonio; Feb. 23, 2009, XP050315333 [retrieved on Feb. 23, 2009].

Qualcomm Europe: "Linger Timer for HNB Cell Reselection" 3GPP Draft; R2-084342 Linger Timer for HNB Cell Reselection, 3rd Generation Partnership Project (3GPP), Mobile Competence Centre ; 650, Route Des Lucioles ; F-06921 Sophia-Antipolis Cedex ; France, no. Jeju; Aug. 12, 2008, XP050319418.

Qualcomm Europe: "Pseudo-CR on Paging Optimization for CSG Cells," 3GPP C1-84840, Nov. 3, 2008.

Rapporteur (Huawei): "Email report on Home-(e)NB mobility, main issues [63 LTE C01]" 3GPP Draft; R2-085705, 3rd Generation Partnership Project (3GPP), Mobile Competence Centre ; 650, Route Des Lucioles ; F-06921 Sophia-Antipolis Cedex ; France, no. Pragu.

Samsung et al: "SGSN and MME acquisition of the Allowed CSG List" 3GPP Draft; S2-090098_HENB_CSG_Alloc, 3rd Generation Partnership Project.

(3GPP), Mobile Competence Centre ; 650, Route Des Lucioles ; F-06921 Sophia-Antipolis Cedex ; France, no. Phoenix; Jan. 7, 2009, XP050332695 [retrieved on Jan. 7, 2009] p. 1-p. 3.

Huawei: "Allowed CSG List handling for H(e)NB" 3GPP TSG SA WG2 70, S2-090203 Jan. 7, 2009, XP002593706 Retrieved from the Internet: URL:http://www.3gpp.org/ftp/tsg_sa/WG2_Arc h/TSGS2_70_Phoeni x/Docs/ [retrieved on Jul. 26, 2010] p. 1, parag.

Huawei: "Paging optimization for CSG deployments" 3GPP Draft; CI-083436, 3rd Generation Partnership Project (3GPP), Mobile Competence Centre ; 650, Route Des Lucioles ; F-06921 Sophia-Antipolis Cedex ; France Aug. 22, 2008, pp. 1-2, XP002577187 Retrieved from the Internet: URL:http://www.3gpp.org/ftp/tsg_CT/ WGI jnmcc- sm_ex-CNI/TSGCI_55/Docs/> [retrieved on Apr. 6, 2010] p. 1-p. 2.

Huawei: "Whit List Automatic Detection Method" 3GPP Draft; C1-083281, 3rd Generation Partnership Project (3GPP), Mobile Competence Centre ; 650, Route Des Lucioles ; F-06921 Sophia-Antipolis Cedex ; France, no. Budapest, Hungary; Aug. 11, 2008.

Nokia Siemens Networks et al: Miscellaneous corrections to 36.304 3GPP Draft; R2-090832 Update of R2-090077 CR to 36304-840, 3rd Generation Partnership Project (3GPP), Mobile Competence Centre ; 650, Route Des Lucioles ; F-06921 Sophia-Antipolis Cedex.

NSN: "User Content and review of White list entries" 3GPP TSG-SA1 44, S1-090110 Jan. 26, 2009 XP002593707 Retrieved from the Internet: URL:http://www.3gpp.org/ftp/tsg_sa/WGI_Ser v/TSGSI_44_SanAntoni o/tdocs/ [retrieved on Jul. 26, 2010].

Panasonic: "Handling of selected CSG cell in LTE HeNB" 3GPP Draft; R2-090099_Handling_of_Selected_CSG_Cell, 3rd Generation Partnership Project (3GPP), Mobile Competence Centre ; 650, Route Des Lucioles ; F-06921 Sophia-Antipolis Cedex ; France, no. Ljubljana; Jan. 6, 2009, XP050322140.

Qualcomm Europe: "Discussion on paging optimization when a user is removed from a CSG" 3GPP Draft; C1-090368, 3rd Generation Partnership Project (3GPP), Mobile Competence Centre ; 650, Route Des Lucioles ; F-06921 Sophia-Antipolis Cedex ; France, no. San Antonio; Feb. 24, 2009, XP050310827 [retrieved on Feb. 24, 2009].

Qualcomm Europe: "Proposed solution to OMA DM/OTA-less H(e)NB with paging optimization" 3GPP Draft; S2-092307, 3rd Generation Partnership Project (3GPP), Mobile Competence Centre ; 650, Route Des Lucioles ; F-06921 Sophia-Antipolis Cedex ; France, no. Hangzhou; Mar. 24, 2009, XP050345596.

Qualcomm Europe: "Provisioning of a UEs white list for CSG Cells" 3GPP Draft; C1_083102, 3rd Generation Partnership Project (3GPP), Mobile Competence Centre ; 650, Route Des Lucioles ; F-06921 Sophia-Antipolis Cedex ; France, no. Budapest, Hungary; Aug. 11, 2008, XP050308779 [retrieved on Aug. 11, 2008] the whole document.

Qualcomm Europe: "Support for Hybrid and Open access mode H(e)NBs" 3GPP Draft; S2-090130, 3rd Generation Partnership Project (3GPP), Mobile Competence Centre ; 650, Route Des Lucioles ; F-06921 Sophia-Antipolis Cedex ; France, no. Phoenix; Jan. 7, 2009.

"3rd Generation Partnership Project; Technical Specification Group Services and System Aspects; Service requirements for Home NodeBs and Home eNodeBs (Release 9)", 3GPP TS 22.220 V1.0.1, Dec. 2008.

Alcatel-Lucent, Nortel Networks, Motorola: "Psuedo CR ESM failure during attach procedure ", 3GPP TSG CT WG1 Meeting #56 C1-085181, Nov. 14, 2008.

Huawei, Qualcomm Europe, Samsung: "Allowed CSG List handling for H(e)NB", 3GPP TSG SA WG2 Meeting #70 TD S2-090693, Jan. 16, 2009.

* cited by examiner

US 8,520,594 B2

SELECTIVELY INCLUDING ALLOWED CLOSED SUBSCRIBER GROUP LIST IN PAGE MESSAGE

CLAIM OF PRIORITY

This application claims the benefit of and priority to commonly owned U.S. Provisional Patent Application No. 61/148,785, filed Jan. 30, 2009; U.S. Provisional Patent Application No. 61/149,258, filed Feb. 2, 2009; U.S. Provisional Patent Application No. 61/157,853, filed Mar. 5, 2009; and U.S. Provisional Patent Application No. 61/160,954, filed Mar. 17, 2009; the disclosure of each of which is hereby incorporated by reference herein.

CROSS-REFERENCE TO RELATED APPLICATION

This application is related to concurrently filed and commonly owned U.S. patent application Ser. No. 12/695,043, entitled "CSG MEMBERSHIP INDICATION,"; and U.S. patent application Ser. No. 12/695,044, entitled "ACCESS CONTROL FOR ACCESS TERMINALS,"; the disclosure of each of which is hereby incorporated by reference herein.

BACKGROUND

1. Field

This application relates generally to wireless communication and more specifically, but not exclusively, to improving communication performance.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, femto access points, femto cells, Home NodeBs (HNBs), Home eNodeBs (HeNBs), or access point base stations. Typically, such small-coverage base stations are connected to the Internet and the mobile operator's network via a DSL router or a cable modem.

In practice, there may be a relatively large number of small-coverage access points deployed in a network. Consequently, when an access terminal being paged has moved in idle state, the network could potentially need to send page messages to a large number of access points (e.g. HNBs and HeNBs). However, many of these access points may have restricted access (e.g., comprise closed subscriber group (CSG) cells). Consequently, paging optimization may be employed to avoid sending pages to access points that an access terminal is not authorized to access. For example, the network may only page an access terminal at those access points that are associated with a tracking area identifier (TAI) that is in the access terminal's registered TAI list and that are associated with a CSG identifier (CSG ID) that is in the access terminal's allowed CSG list (e.g., CSG whitelist).

A potential problem with such paging optimization relates to its interaction with the synchronization between the network and the access terminal of CSG subscriber information (e.g., the allowed CSG list). For example, a subscriber may be removed from a CSG, but the access terminal's allowed CSG list may not be updated for some time. If the network is updated and then does not page the access terminal at any access points associated with this CSG, it is possible that the access terminal may be in idle mode at an access point for this CSG and not be reachable for paging. As another example, when a CSG subscription expires, the entry for this CSG in the allowed CSG list of the access point may not immediately be removed. In this case, if the access terminal camps on an access point for this CSG in idle mode prior to determining that the subscription has expired, the access terminal may not be reachable for paging.

An additional potential problem of paging optimization relates to how long the CSG ID of an expired CSG is to be stored in the network (e.g., in a subscription server, a mobility manager, etc). One possible approach is to store the CSG ID until after the CSG ID is removed from the access terminal list (e.g., by an open mobile alliance device management (OMA-DM) update or over the air (OTA) update). However, such an approach requires OMA-DM or OTA to be run to remove the CSG.

As mentioned above, paging optimization may be employed to avoid sending pages to access points where an access terminal is not authorized. One way of achieving this is to include the access terminal's whitelist (e.g., a CSG whitelist) in the page. For example, a mobility manager may use its knowledge of the whitelist to filter the pages that it sends out. Thus, the paging optimization may be optionally performed at the mobility manager. As another example, if an access point gateway is employed (e.g., a HeNB gateway, HeNB-GW), the access point gateway may use the whitelist included in the page to filter the page. Thus, the paging optimization may optionally be performed at an access point gateway. As yet another example, upon receiving a page including a whitelist, an access point may use the whitelist to decide whether or not to transmit the page over the air. Thus, the paging optimization may optionally be performed at the access point. This may be useful if the mobility manager or the access point gateway does not perform any paging optimization. However, there may be a concern that sending a whitelist to an access point may violate security concerns if the access point (e.g., a HeNB) is a customer device.

SUMMARY

A summary of sample aspects of the disclosure follows. In the discussion herein, any reference to the term aspects may refer to one or more aspects of the disclosure.

The disclosure relates in some aspects to mitigating problems caused by the interaction between paging optimization and synchronizing CSG information stored in a network and in access terminals that access the network. For example, when a subscriber is removed from a CSG or a subscription to a CSG expires, the network may set an indication to indicate that the subscriber is no longer a member of the CSG. In some aspects, this indication may indicate that removal is pending for a CSG ID from a CSG list maintained at an access terminal associated with the subscriber. That is, the indication may indicate that the network is aware that the subscriber is no longer a member of the CSG but that an access terminal associated with the subscriber may not be aware of this fact.

When such an indication is set, the network may still page that access terminal at access points associated with this CSG. Consequently, an access terminal camped at an access point that the access terminal is not allowed to access (e.g., due to recently losing membership at a CSG), will still be reachable for paging. However, the network will not allow the access terminal to access such an access point since the subscriber is no longer a member of the CSG.

The disclosure relates in some aspects to a timer-based scheme for removing a CSG ID from the subscriber information for a subscriber once it is determined that the subscriber is no longer a member of the CSG. For example, the network may commence a timer upon determining that the subscriber is no longer a member of the CSG. If an access terminal associated with that subscriber does not access an access point associated with the CSG before the timer expires, the network removes the CSG ID from the subscriber information. A corresponding timer is also employed at the access terminal to ensure that the access terminal will not camp on an access point where access is not allowed (e.g., due to loss of CSG membership). For example, if the access terminal accesses (e.g., reselects to) an access point associated with the CSG, the access terminal is required to register at the access point if the access terminal has not accessed any access points associated with the CSG for a defined period of time prior to the access (e.g., reselection). Here, the timer period for the access terminal is shorter than the timer period for the network. Through the use of this timer-based scheme, it may be ensured that if the access terminal reselects to an access point associated with the CSG after the network has removed the CSG ID from the subscriber information (by operation of the network's timer), the access terminal will be required to register with the network. Since the registration by access terminal will be rejected by the network in this case (due to the removal of the CSG ID), the access terminal will inherently be informed that is no longer a member of the CSG. Accordingly, the access terminal will not camp at an access point that the access terminal is not allowed to access due to the loss of CSG membership.

The disclosure relates in some aspects to a scheme whereby a temporary member of a CSG determines whether it is still a member of the CSG upon expiration of a CSG timer. For example, both the network and an access terminal may maintain CSG timers for determining when a temporary subscription to the CSG expires. However, it is possible that the network's CSG timer may expire after the access terminal's CSG timer expires. Hence, upon expiration of the access terminal's CSG timer, the access terminal may take steps to determine whether it is still a member of the CSG. For example, the access terminal may access a CSG list server to obtain an up-to-date CSG list for the access terminal Alternatively, the access terminal may initiate access (e.g., register) at an access point associated with the CSG. In this case, the registration will be rejected if the network's timer has expired, while the registration may be successful if the network's timer has not expired.

The disclosure relates in some aspects to changing the frequency at which an access terminal registers. For example, in conjunction with a timer-based temporary CSG membership scheme, if an access terminal determines that it is still a member of the CSG after the access terminal's CSG timer expires, the access terminal may increase the frequency with which the access terminal registers at access points associated with the CSG. In this way, the access terminal may more quickly determine when its subscription actually expires. As another example, an access terminal may change the frequency at which it registers based on the available wireless coverage. Here, if wireless coverage is only available from a CSG cell or a hybrid cell, the access terminal may increase the frequency with which the access terminal registers at those cells. Conversely, if wireless coverage is available from at least one alternate cell, the access terminal may not increase (e.g., may decrease) the frequency with which it registers.

The disclosure relates in some aspects to selectively including an allowed CSG list (e.g., a CSG whitelist) in page messages depending on the destination of the page message. For example, a mobility manager may include allowed CSG list information in pages sent to certain types of nodes (e.g., access point gateways and eNodeBs), but not include allowed CSG list information in pages sent to other types of nodes (e.g., HeNBs). Here, the mobility manager may acquire information indicative of a type of the node to which the page is destined or indicative of the number of CSGs supported by such a node, and then make a determination as to whether to include the allowed CSG list based on this acquired information. Also, an access point gateway may include allowed CSG list information in pages sent to certain types of nodes (e.g., eNodeBs), but not include allowed CSG list information in pages sent to other types of nodes (e.g., HeNBs).

BRIEF DESCRIPTION OF THE DRAWINGS

These and other sample aspects of the disclosure will be described in the detailed description and the appended claims that follow, and in the accompanying drawings, wherein:

Figure 1:
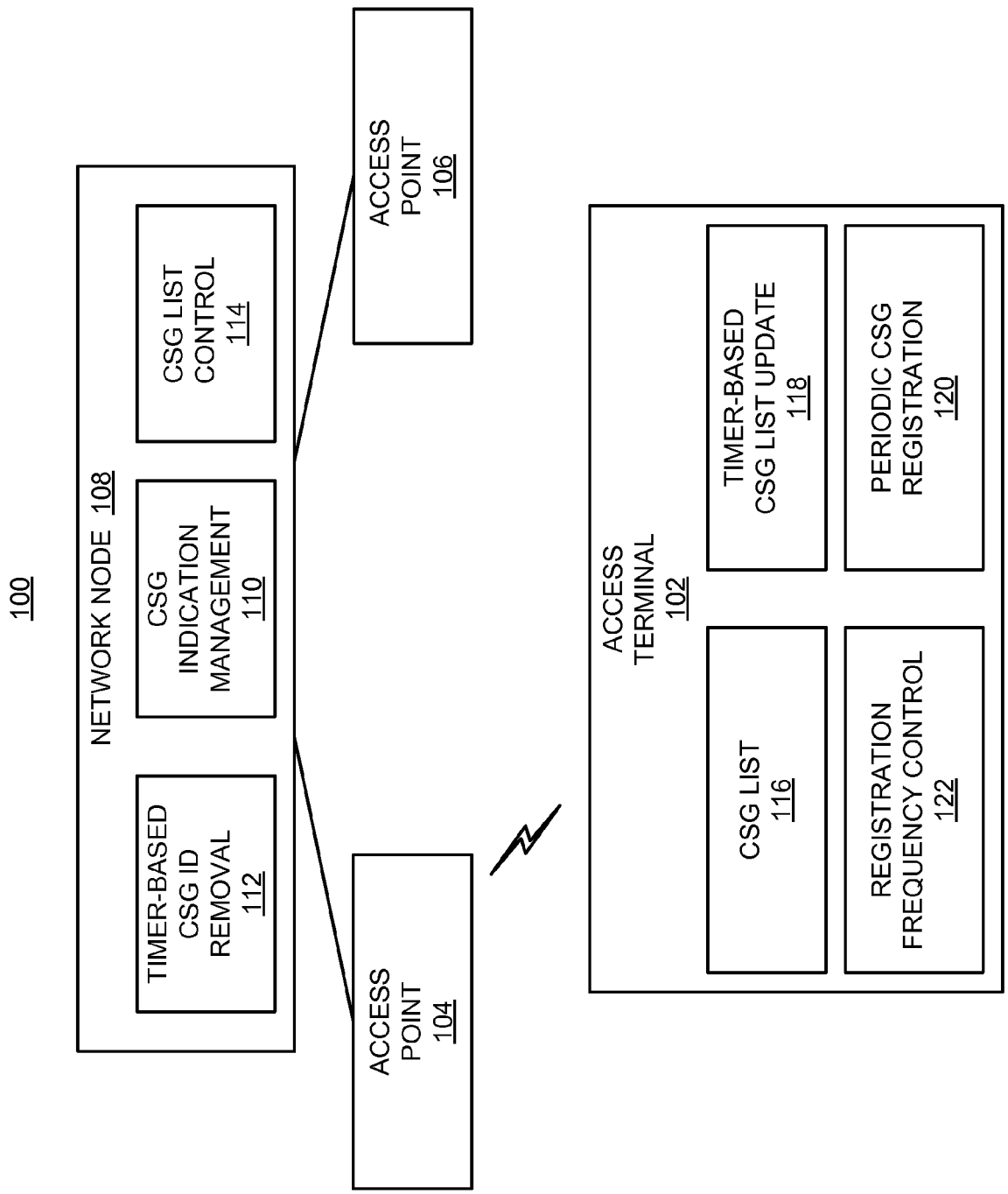
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, cells, and so on, while access terminals may be referred to or implemented as user equipment, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point (not shown).

Each of the access points may communicate with one or more network nodes (represented, for convenience, by network node 108) to facilitate wide area network connectivity. The network node 108 may take various forms such as, for example, one or more radio and/or core network entities. Thus, in various implementations the network node 108 may represent functionality such as at least one of: network management (e.g., via an operation, administration, management, and provisioning entity), call control, session management, mobility management, gateway functions, interworking functions, subscription server functions, CSG management functions, or some other suitable network functionality. In some aspects, mobility management relates to keeping track of the current location of access terminals through the use of tracking areas, location areas, routing areas, or some other suitable technique, and controlling paging for the access terminals. Also, two of more of these network entities may be co-located or distributed within the network.

FIG. 1 illustrates sample aspects of the functionally that may be employed at various nodes in the system 100 in conjunction with the teachings herein. These aspects of the disclosure are described in detail below in conjunction with FIGS. 3-14 as follows.

In some implementations, one or more network entities provide CSG indication management functionality 110 to, for example, set and use a network-based indication that indicates that a subscriber is no longer a member of a CSG. This aspect of the disclosure is described in detail at FIGS. 3A-5.

In some implementations, the access terminal 102 provides periodic CSG registration functionality 120 to force the access terminal to register at an access point associated with a CSG if the access terminal has not accessed such an access point for a defined period of time. In addition, one or more network entities provide timer-based CSG ID removal functionality 112 whereby a CSG ID is removed from CSG subscriber information if the access terminal has not accessed an access point associated with the CSG before expiration of a timer. This aspect of the disclosure is described in detail at FIGS. 6-8.

In some implementations, the access terminal 102 provides registration frequency control functionality 122 to change the frequency with which the access terminal registers based on various criteria. This aspect of the disclosure is described in detail at FIG. 9.

In some implementations, the access terminal 102 also provides timer-based CSG list update functionality 118 to update a CSG list 116 maintained at the access terminal. Here, in the event the timer indicates that a CSG subscription has expired, the access terminal may commence various actions to verify whether the access terminal is still able to access an access point associated with that CSG. This aspect of the disclosure is described in detail at FIGS. 10-12.

In some implementations, one or more network entities may provide CSG list control functionality 114 whereby allowed CSG list information is selectively included in a page message based on the destination for the page message. This aspect of the disclosure is described in detail at FIGS. 13A-14.

Figure 2:
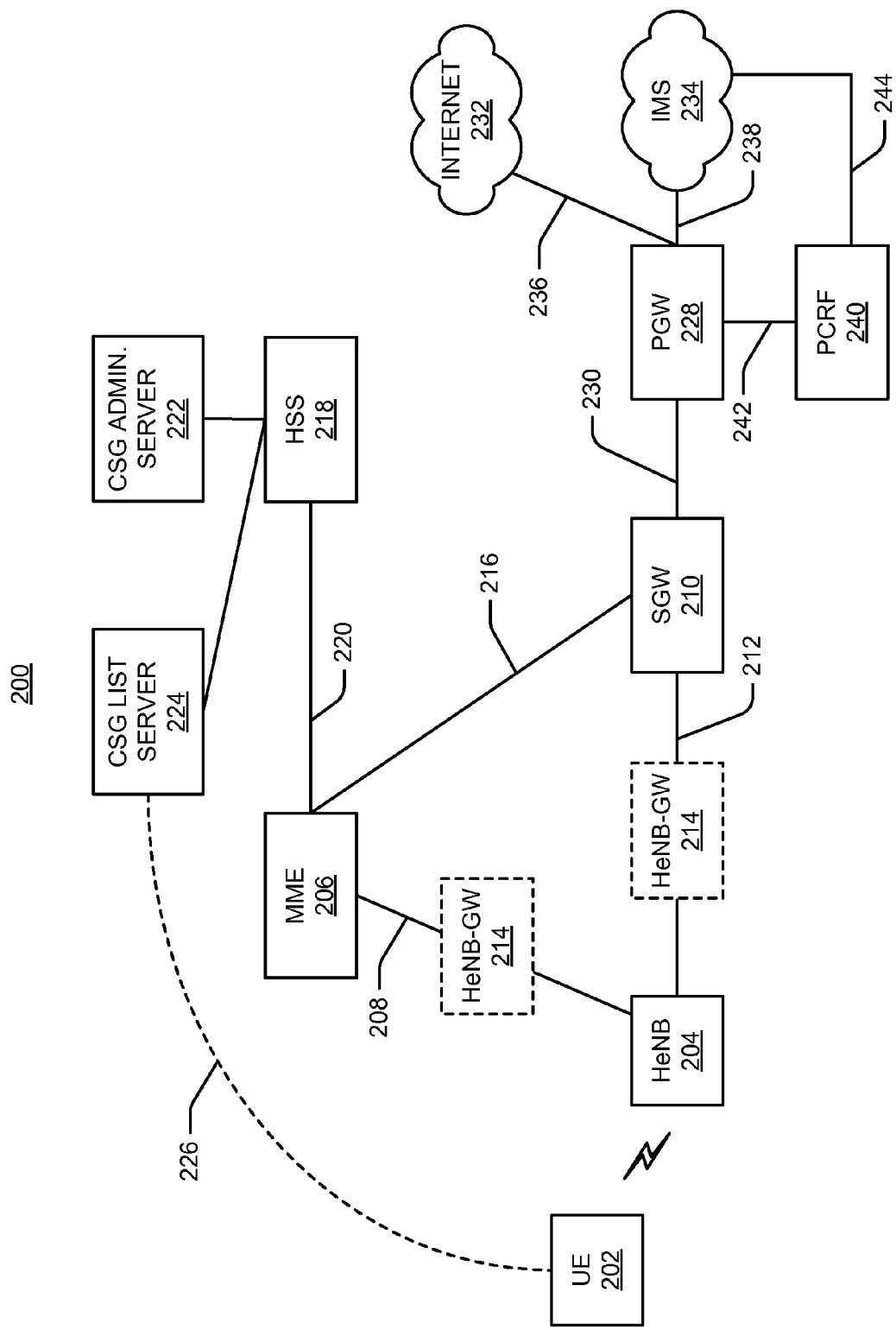
FIG. 2 is a simplified block diagram of several sample aspects of an LTE-based communication system.

For purposes of illustration, various aspects of the disclosure will be described in the context of an LTE-based network. FIG. 2 illustrates sample components that may be employed in an LTE-based network 200 to provide functionality as taught herein.

User equipment (UE) 202 communicates via wireless signals with a HeNB 204 (e.g., via E-UTRA protocol). The HENB 204 may communicate with a mobility management entity (MME) 206 via an S1-MME protocol as represented by line 208. The HeNB 204 also may communicate with a serving gateway (SGW) 210 via an S1-U protocol as indicated by line 212. In some implementations, HeNBs may be connected to the core network components via one or more HeNB-GWs. Accordingly, an optional HeNB-GW 214 is represented in phantom, in the signaling paths 208 and 212.

The MME 206 may communicate with the SGW 210 via an S11 protocol as indicated by line 216. The MME 206 also may communicate with a home subscriber server (HSS) 218 via an Sha protocol as indicated by line 220.

The HSS 218 comprises a database that manages, for example, subscriber information (e.g., CSG subscriber information) for each of the subscribers in the network 200. The HSS 218 communicates with CSG management components to facilitate maintaining and updating CSG information for the network 200. For example, the HSS 218 may communicate with a CSG administration server 222 and a CSG list server 224. The CSG administration server 222 may, for example, provide functionality that enables a CSG manager (e.g., an owner of a HeNB) to add/remove subscribers (e.g., access terminals associated with a subscriber) to/from a given CSG. The CSG list server 224 may manage CSG lists for subscribers in the network 200. For example, whenever a subscriber is added to or deleted from a CSG, the CSG list server 224 may communicate with UEs in the network 200 to update CSG lists (e.g., allowed CSG lists) maintained at the UEs. As represented by the dashed line 226, the UE 202 may communicate with the CSG list server 224 via OMA-DM protocol or OTA protocol. That is, the UE 202 may establish a communication link with the CSG list server via the HeNB 204 or some other access point in the network 200 (not shown in FIG. 2).

The SGW 210 may communicate with a packet data network gateway (PGW) 228 via an S5 or an S8 protocol as indicated by line 230. The PGW 228 may communicate with packet data network entities such as the Internet 232 and an IP multimedia subsystem (IMS) 234 via SGi protocols as indicated by lines 236 and 238, respectively. Also, a policy and charge rules function (PCRF) 240 may communicate with the PGW 228 via Gx protocol as indicated by line 242 and the IMS 234 via Rx protocol as indicated by line 244.

It should be appreciated that the teachings herein may be implemented in various types of networks. For example, in some aspects functionality described herein as being performed by an MME and/or an SGW may be performed in a UMTS system by a mobile switching center/visitor location register (MSC/VLR) and/or a serving GPRS support node (SGSN). Also, in some aspects functionality described herein as being performed by an HSS may be performed in a UMTS system by a home location register (HLR).

Referring now to FIGS. 3A-5, sample operations that may be performed when a subscriber loses membership to a CSG are described. Such a loss of membership may occur in various ways. For example, in some cases a subscriber may be removed from a CSG (e.g., as described in FIG. 4). In some cases a subscription to a CSG may expire. For example, a subscriber may be a temporary member of the CSG, where the subscription expires after a defined period of time or at a specified time.

As mentioned above, some time may pass before an access terminal associated with the subscriber discovers that the subscriber is no longer a member of the CSG. Consequently, a CSG list (e.g., an allowed CSG list) maintained at the access terminal may not be updated for some time. In this case, if the access terminal camps on an access point associated with that CSG, the access terminal could be unreachable because the network would ordinarily cease paging the access terminal at access points associated with that CSG once the membership is no longer valid.

To address this issue, in accordance with the teachings herein the network may set an indication to enable the network to know whether to page an access terminal at a CSG after the subscriber is removed from the CSG or the CSG subscription expires. In some implementations, this indication may be stored in the CSG subscription (i.e., subscriber) information for the subscriber (e.g., exchanged between the HSS and MME). In some implementations, this indication comprises a field defined as a CSG state.

In some implementations, the indication (e.g., the CSG state) is defined to have two possible values. A "remove pending" value may be set once it is determined that the subscriber is no longer a member of the CSG (e.g., removed from CSG or subscription expired). An "active" value may be the default value.

Several advantages may be obtained through the use of this indication scheme. As discussed above, a network may avoid the situation where an access terminal is not reachable for paging due to camping on an access point associated with a CSG after a subscription change occurs. Moreover, such a scheme may reduce provisioning requirements on the network relating to updating a CSG list at an access terminal when the CSG subscription information changes. For example, an operator may not need to update the CSG list immediately after the subscription changes. Instead, the operator may elect to update the access terminal's CSG list based on a schedule (e.g., daily, weekly, monthly) or in some other manner.

Sample operations relating to setting and using a CSG indication as taught herein will now be described in more detail in conjunction with the flowchart of FIGS. 3A and 3B. For convenience, the operations of FIGS. 3A and 3B (or any other operations discussed or taught herein) may be described as being performed by specific components (e.g., components of FIG. 1, 2, or 15). It should be appreciated, however, that these operations may be performed by other types of components and may be performed using a different number of components. It also should be appreciated that one or more of the operations described herein may not be employed in a given implementation.

Figure 3A:
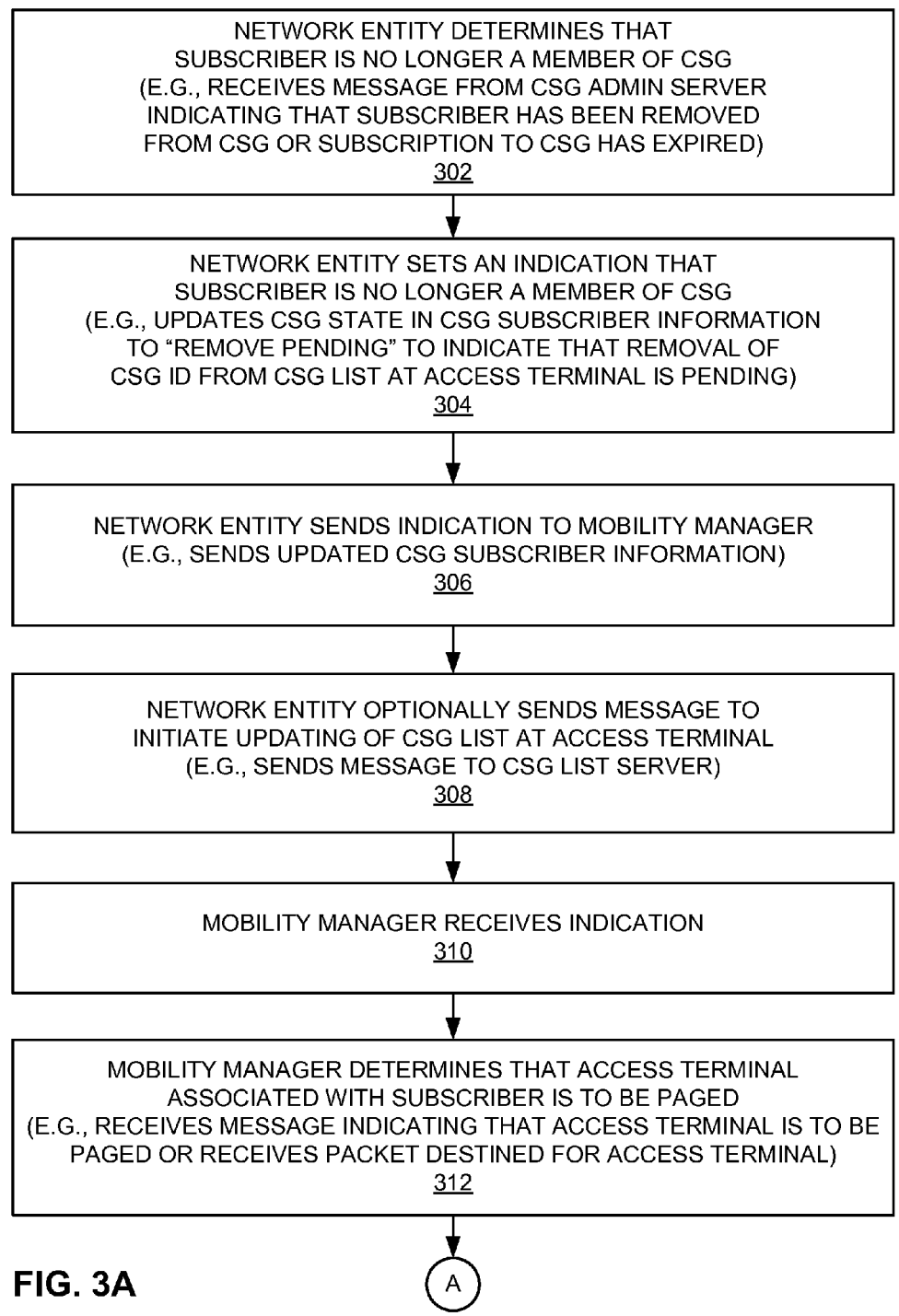
FIGS. 3A and 3B are a flowchart of several sample aspects of operations that may be performed in conjunction with the setting of an indication that a subscriber is no longer a member of a CSG.

As represented by block 302 of FIG. 3A, at some point in time a network entity (e.g., an HSS or HLR) determines that a subscriber is no longer a member of a CSG. For example, the network entity may receive a message from a CSG administration server that indicates that a subscriber has been removed from a CSG. Alternatively, the network entity may determine (e.g., by expiration of a timer at the network) that a subscription to a CSG for a subscriber has expired.

In some aspects the term subscriber corresponds to an access terminal For example, the term subscriber may describe a person who owns or uses an access terminal that is enabled to access an access point associated with a particular CSG. In some aspects, the access terminal may be considered to be (e.g., may comprise) the subscriber. Thus, when referring to a subscriber no longer being a member of a CSG, this also means in some sense that a particular access terminal is (or access terminals are) no longer a member of that CSG.

As represented by block 304, in response to the determination of block 302, the network entity sets an indication that indicates that the subscriber is no longer a member of the CSG. For example, the network entity may set a state to a value of remove pending or provide an indication in some other manner. In some implementations, in conjunction with setting the indication, the network entity may update CSG subscriber information for the subscriber maintained at the network entity to reflect the setting of the indication. In some aspects, the setting of the indication indicates that removal is pending for a corresponding CSG ID from a CSG list at a specific access terminal or specific access terminals.

As represented by block 306, the network entity sends the indication to a mobility manager (e.g., an MME, SGSN, MSC, etc.). For example, the network entity may send the subscriber's CSG subscriber information that was updated at block 304 to the mobility manager.

As represented by block 308, the network entity may optionally send a message to initiate updating of a CSG list at an access terminal corresponding to the subscriber. For example, the network entity may send a message to a CSG list server which causes the CSG list server to communicate with the access terminal to update a CSG list at the access terminal.

As represented by block 310, the mobility manager receives the indication that was sent at block 306. In some implementations, the mobility manager may thereby update CSG subscriber information for the subscriber maintained at the mobility manager to reflect the receipt of the indication (e.g., receipt of an updated CSG state in the CSG subscriber information).

As represented by block 312, at some point in time, the mobility manager may determine that the access terminal is to be paged. For example, in some implementations the mobility manager may receive a message (e.g., from an SGW) that indicates that the access terminal is to be paged. In some implementations, the mobility manager (e.g., an SGSN) may receive a packet destined for the access terminal.

Figure 3B:
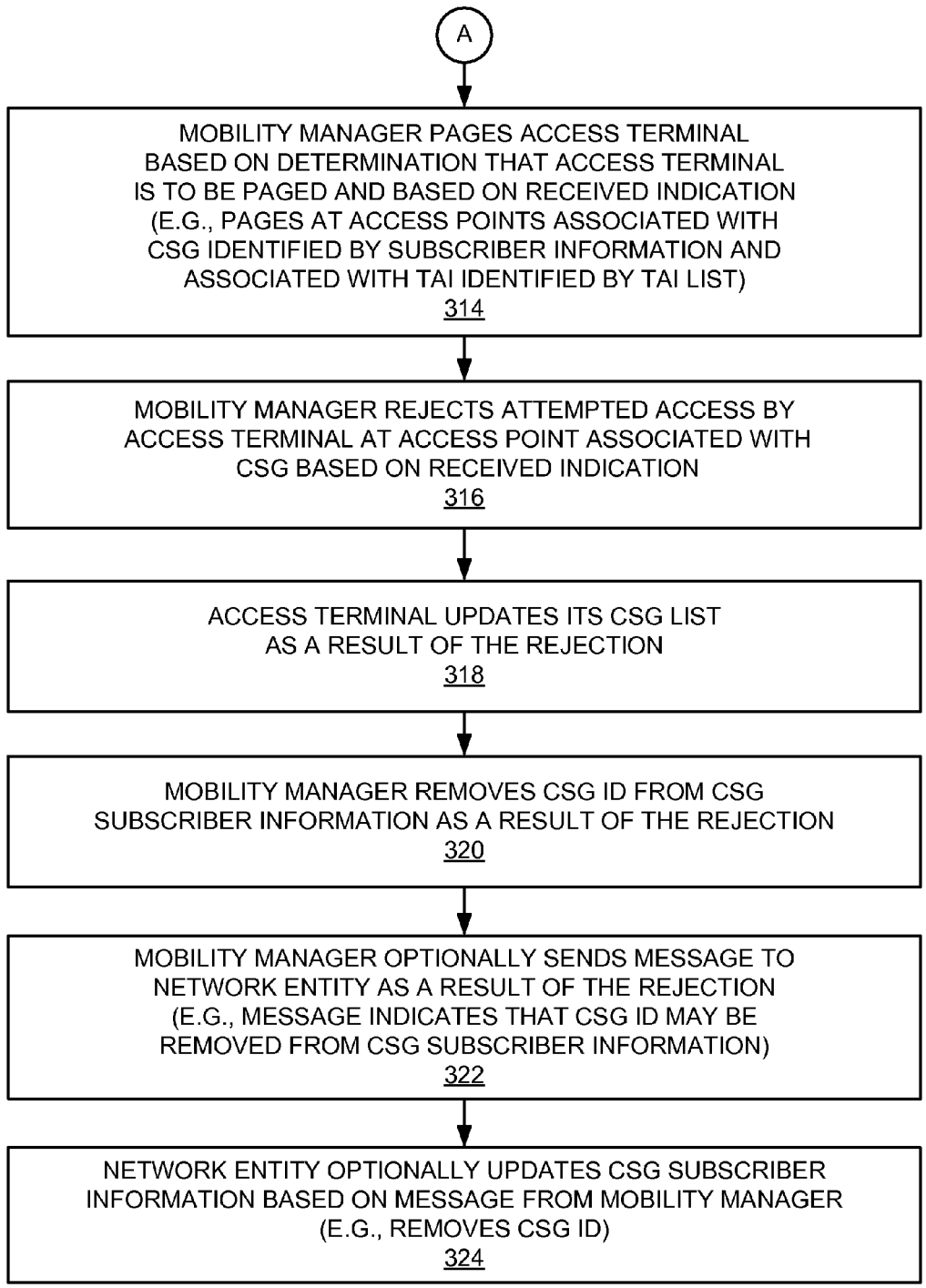

As represented by block 314 of FIG. 3B, the mobility manager may page the access terminal based on the determination of block 312 and the receipt of the indication at block 310. In particular, the mobility manager may page the access terminal at access points associated with the CSG of which the access terminal (subscriber) is no longer a member. That is, upon receiving the indication, the mobility manager know it is to page the access terminal at access points associated with this CSG even though the access terminal is no longer a member of the CSG.

It should be understood that other criteria may be taken into account when identifying the access points to which the pages for the access terminal should be directed. For example, a page may only be sent to those access points that are also associated with a TAI (or some other suitable indication) that is associated with the access terminal (e.g., listed in the access terminal's TAI list). Thus, the MME may page the access terminal at all CSGs where the indication is set (e.g., CSG state set to remove pending) for that access terminal and that advertise a TAI where the access terminal may be camped.

As represented by block 316, at some point in time, the access terminal may attempt to access an access point associated with the CSG of which the access terminal is no longer a member. For example, the access terminal may have been paged at the CSG or the access terminal may attempt access based on automatic or manual reselection. Since the access terminal's CSG list has not yet been updated, the access terminal may still determine that it is allowed to access such an access point when within the coverage of the access point. Hence, the access terminal may attempt an access at that access point. However, based on the identifier received at block 310, the mobility manager will know that the access terminal is not allowed to access any access point associated with that CSG. Hence, the mobility manager will reject the attempted access by the access terminal (e.g., by sending a rejection message indicating that the access terminal is not authorized for this CSG).

As represented by block 318, the access terminal may update a CSG list maintained at the access terminal based on the rejection. For example, upon receiving the rejection message, the access terminal may determine that it is no longer a member of the corresponding CSG. Thus, in this case, the access terminal CSG list may be updated without using OMA-DM, OTA, or some other protocol to communicate with the CSG list server.

As represented by block 320, the mobility manager may update CSG subscriber information for the subscriber maintained at the mobility manager as a result of the rejection. For example, the mobility manager may delete the corresponding CSG ID from the CSG subscriber information.

As represented by block 322, the mobility manager also may send a message to the network entity as a result of the rejection. For example, the mobility manager may send a message that indicates that the corresponding CSG ID may be removed from the CSG subscriber information for the subscriber.

As represented by block 324, the network entity may then update CSG subscriber information for the subscriber maintained at the network entity based on the message sent at block 322. For example, the network entity may delete the corresponding CSG ID from the CSG subscriber information.

Figure 4:
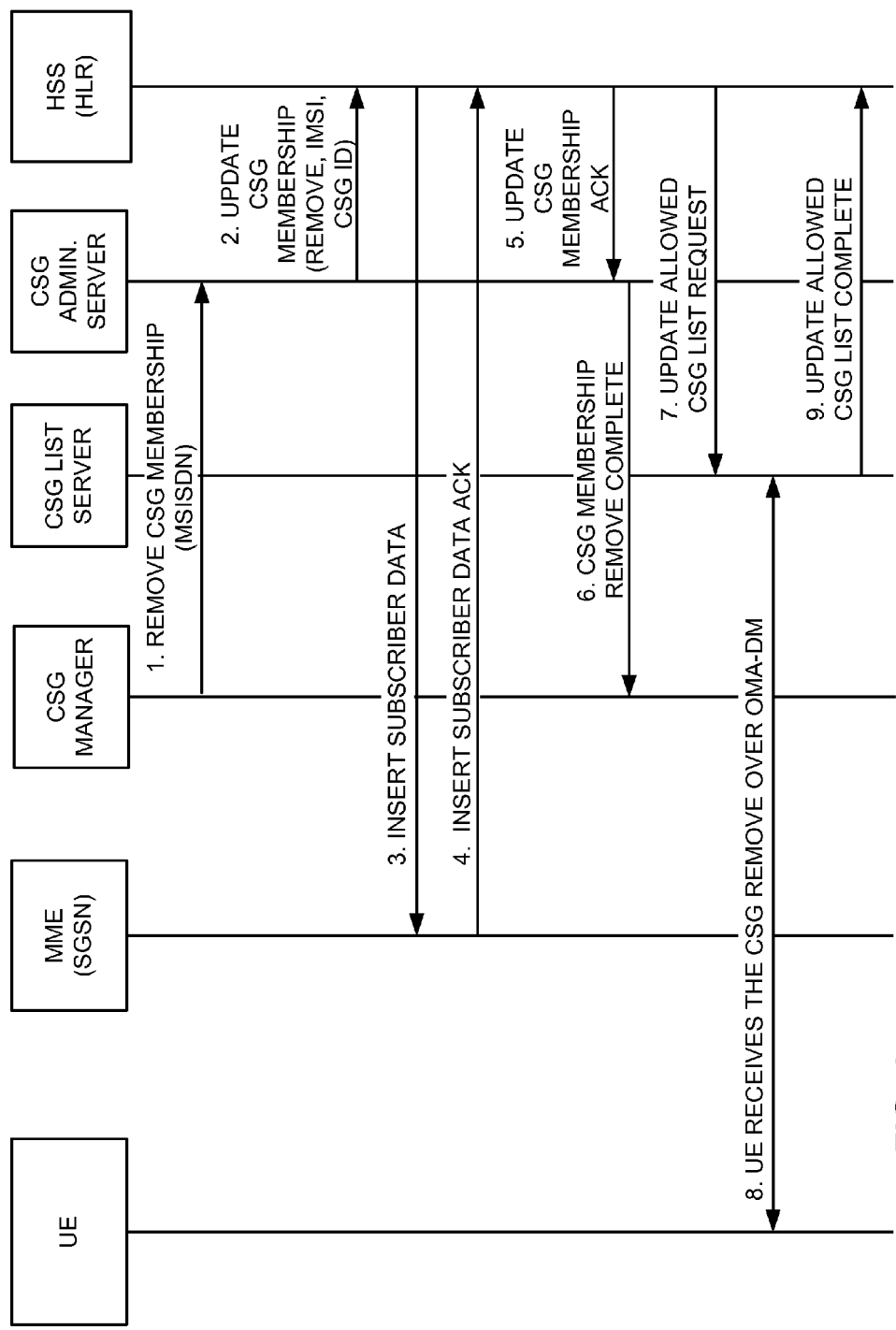
FIG. 4 is a simplified call flow diagram illustrating sample operations that may be perform in conjunction with removing a subscriber from a CSG.

FIG. 4 depicts a more specific example of call flow of operations that may be performed in conjunction with removal of a subscriber from a CSG. In particular, this example is described in the context of an LTE or UMTS system.

At step 1, the CSG manager sends a request to the CSG administration server to remove a subscriber from the CSG. For example, the CSG manager may log into a web page with a secure user identifier and password, click a tab on the web page for his or her CSG, perform a search for subscribers (e.g., access terminals), and select a subscriber to be removed.

At step 2, the CSG administration server communicates with the HSS or HLR (hereafter referred to for convenience as simply the HSS) to update the subscriber's allowed CSG list stored in the HSS. Since the allowed CSG list on the access terminal has not yet been updated to indicate that the CSG has been removed, the CSG administration server may indicate to the HSS that subscriber has been removed (e.g., the CSG state for this entry may be set to remove pending). In some implementations, the CSG administration server accesses the HSS for the subscriber in order to update the allowed CSG list. In the case of roaming, provisions may be made to enable the CSG administration server of the visited network where the CSG is located to access to the HSS of the subscriber or CSG subscription information may be handled in some other manner.

At step 3, the HSS updates the CSG subscriber information for the subscriber (e.g., sets CSG state to remove pending). In addition, if the access terminal is currently attached at an MME or SGSN (hereafter referred to for convenience as simply the MME), then the HSS sends an insert subscriber data (IMSI, CSG Subscription Data) message to the MME indicating the new CSG state for the CSG for the subscriber (e.g., in the allowed CSG list). At step 4, the MME returns an insert subscriber data ack message to the HSS.

At step 5, the HSS confirms to the CSG administration server that the subscriber has been removed. At step 6, the CSG administration server confirms to the CSG manager that the subscriber has been removed.

At step 7, the HSS informs the CSG list server that the access terminal is no longer a member of the CSG in order to update a CSG list (e.g., allowed CSG list) on the access terminal. At step 8, the CSG list server and the access terminal perform an application level update of the access terminal's CSG list (e.g., using OTA or OMA-DM procedures). At step 9, the CSG list server notifies the HSS that the CSG list has been updated successfully. The HSS may then send an insert subscriber data (IMSI, Subscription Data) message to the MME (call flow not shown) indicating that the CSG has been removed from the CSG list.

The call flow of FIG. 3 may apply to an access terminal in idle mode or connected mode. In the case of idle mode, it may be necessary to page the access terminal and establish a connection to perform step 8.

Figure 5:
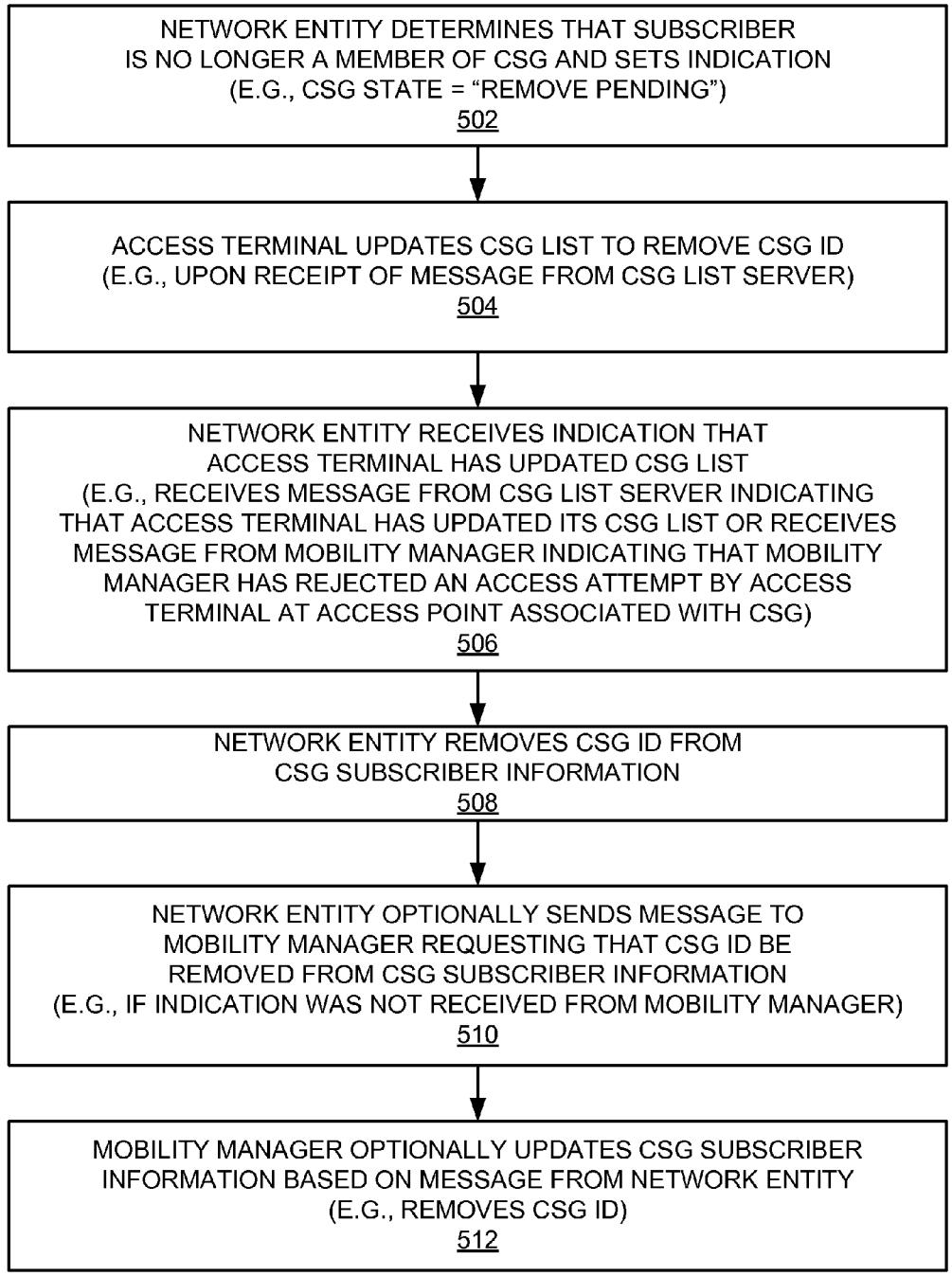
FIG. 5 is a flowchart of several sample aspects of operations that may be performed once an access terminal updates its CSG list.

FIG. 5 describes several operations that may be performed when the network learns that an access terminal has updated its CSG list. For example, CSG subscriber information at the network entity and the mobility manager may be updated to remove the corresponding CSG ID and, if applicable, the CSG indication may be reset (e.g., CSG state set to active).

As represented by block 502, at some prior point in time, the network entity determined that a subscriber is no longer a member of a CSG and set a corresponding indication. Thus, in some aspects these operations may correspond to the operations described above at blocks 302 and 304.

As represented by block 504, at some point in time, the access terminal corresponding to the subscriber updates a CSG list maintained at the access terminal to remove the CSG ID for the CSG. This action may be triggered by various events. In some cases, the access terminal may update its CSG list upon being rejected at an access point of the CSG (e.g., as discussed above at block 318). In some cases, the access terminal may communicate with the CSG list server to obtain updated CSG information (e.g., an updated allowed CSG list). For example, the access terminal may perform an application level update (e.g., using OMA-DM or OTA procedures) to synchronize the CSG list at the access terminal to the CSG list at the network. As discussed above at block 308, this update may be initiated by the network. For example, upon updating the CSG list information for the access terminal, the CSG list server may initiate communication with the access terminal to update the CSG list information at the access terminal as well. In other cases, the access terminal may initiate such communication.

As represented by block 506, at some point in time, the network entity receives an indication that the access terminal has updated its CSG list. This indication may be received in various ways. In some cases, the network entity receives a message from a mobility manager that indicates that the mobility manager rejected an attempted access by the access terminal at an access point for the CSG (e.g., as discussed above at block 322). In some cases, the network entity receives a message from a CSG list server or some other network entity that indicates that the access terminal has updated its CSG list.

As represented by block 508, the network entity may then update CSG subscriber information for the subscriber maintained at the network entity as a result of the receipt of the indication at block 506. For example, the network entity may delete the corresponding CSG ID from the CSG subscriber information. In addition, in some implementations, the network entity may reset the value of a stored indication (e.g., reset the value of the CSG state stored in the CSG subscriber information).

As represented by block 510, the network entity may send a message to the mobility manager as a result of the receipt of the indication at block 506. For example, the network entity may send a message requesting that the corresponding CSG ID be removed from the CSG subscriber information for the subscriber (e.g., by sending updated CSG subscriber information to the mobility manager).

As represented by block 512, the mobility manager may then update the CSG subscriber information for the subscriber maintained at the mobility manager based on the message sent at block 510. For example, the mobility manager may delete the corresponding CSG ID from the CSG subscriber information. In addition, the network entity may reset the value of a stored indication (e.g., CSG state).

Figure 6:
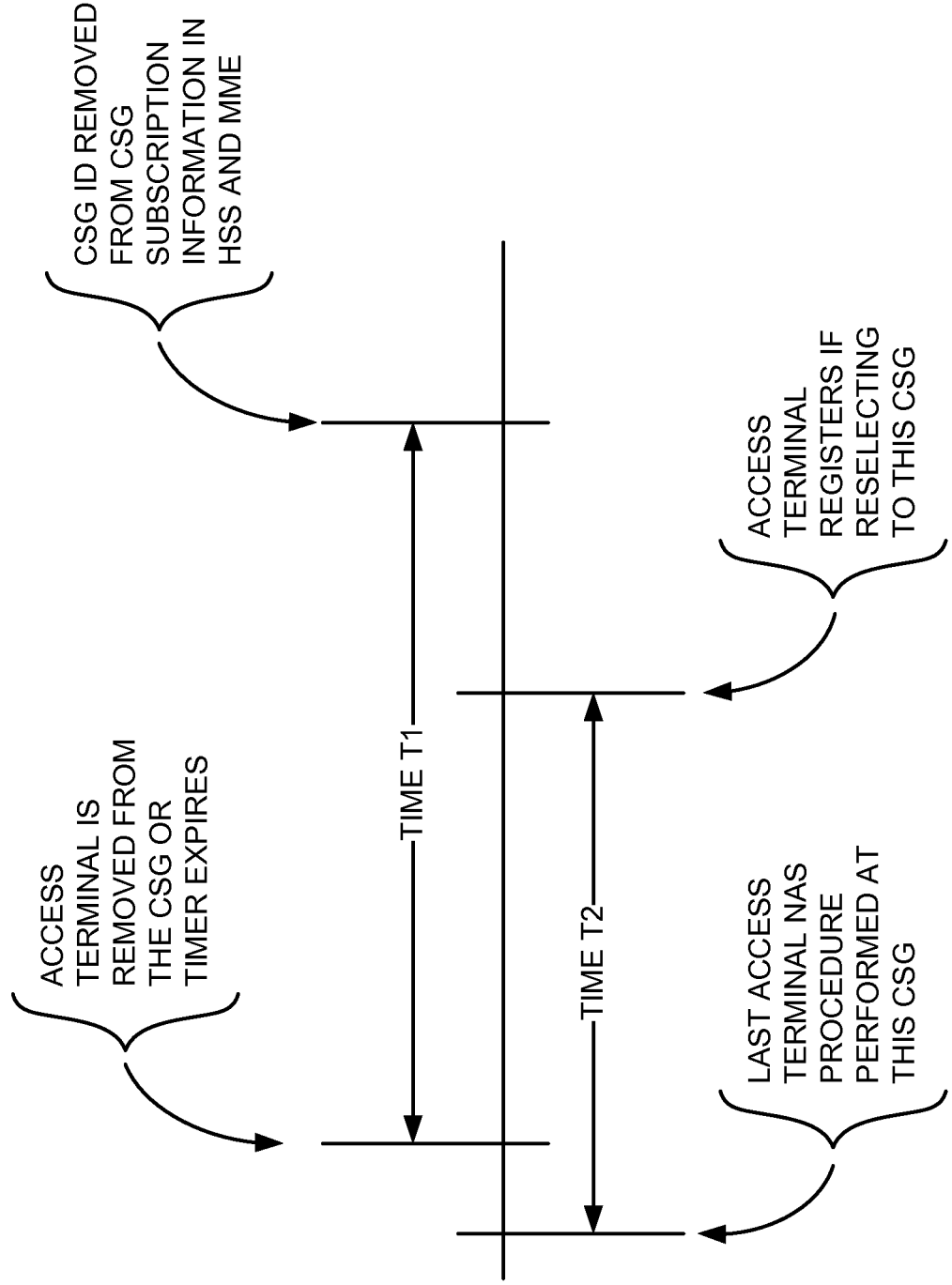
FIG. 6 is a simplified diagram illustrating interaction of CSG timers at a network and an access terminal in conjunction with a timer-based scheme for removing a CSG ID from CSG subscriber information.
Figure 7:
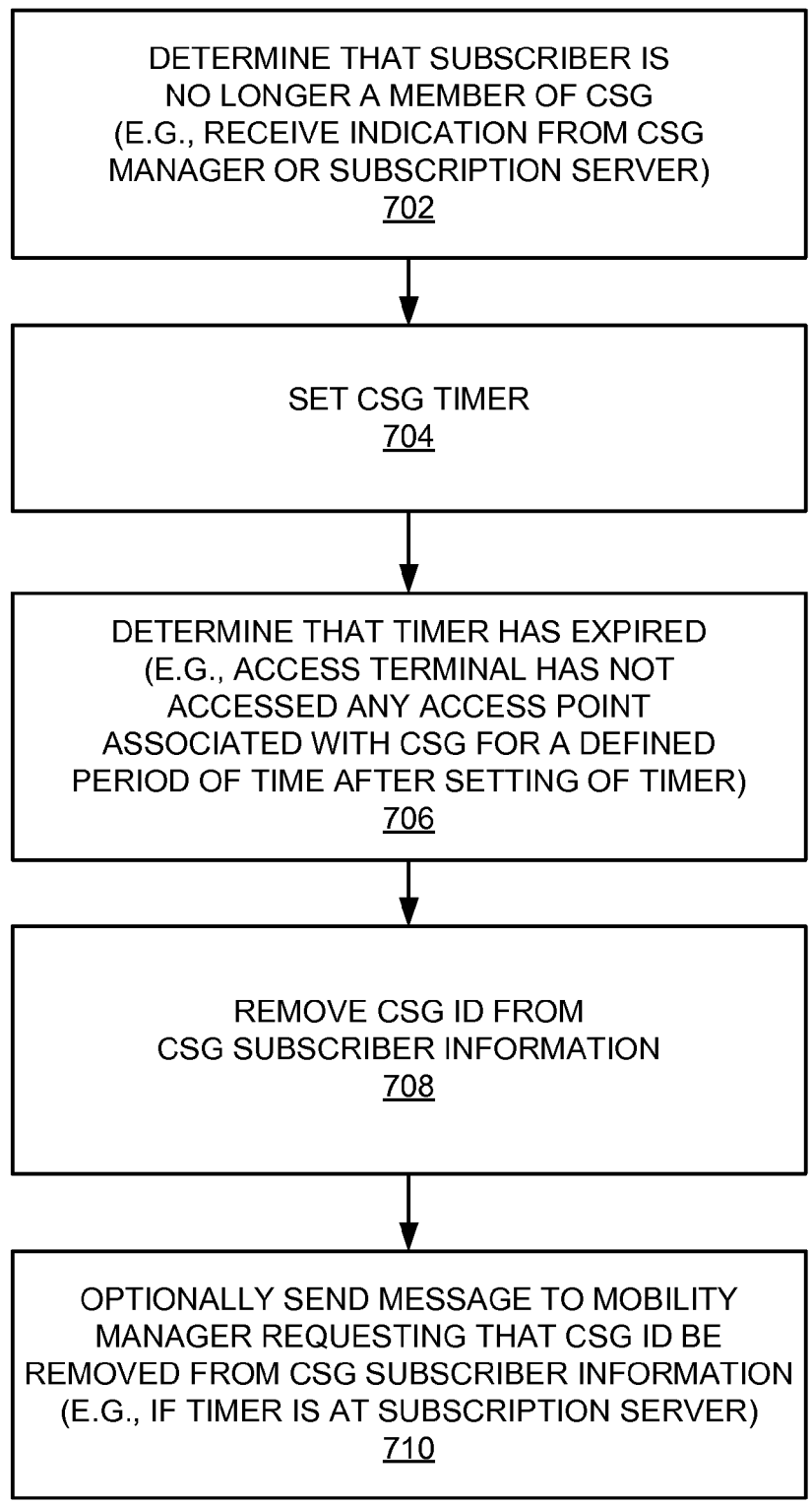
FIG. 7 is a flowchart of several sample aspects of operations that may be performed in conjunction with a timer-based scheme for removing a CSG ID from CSG subscriber information.
Figure 8:
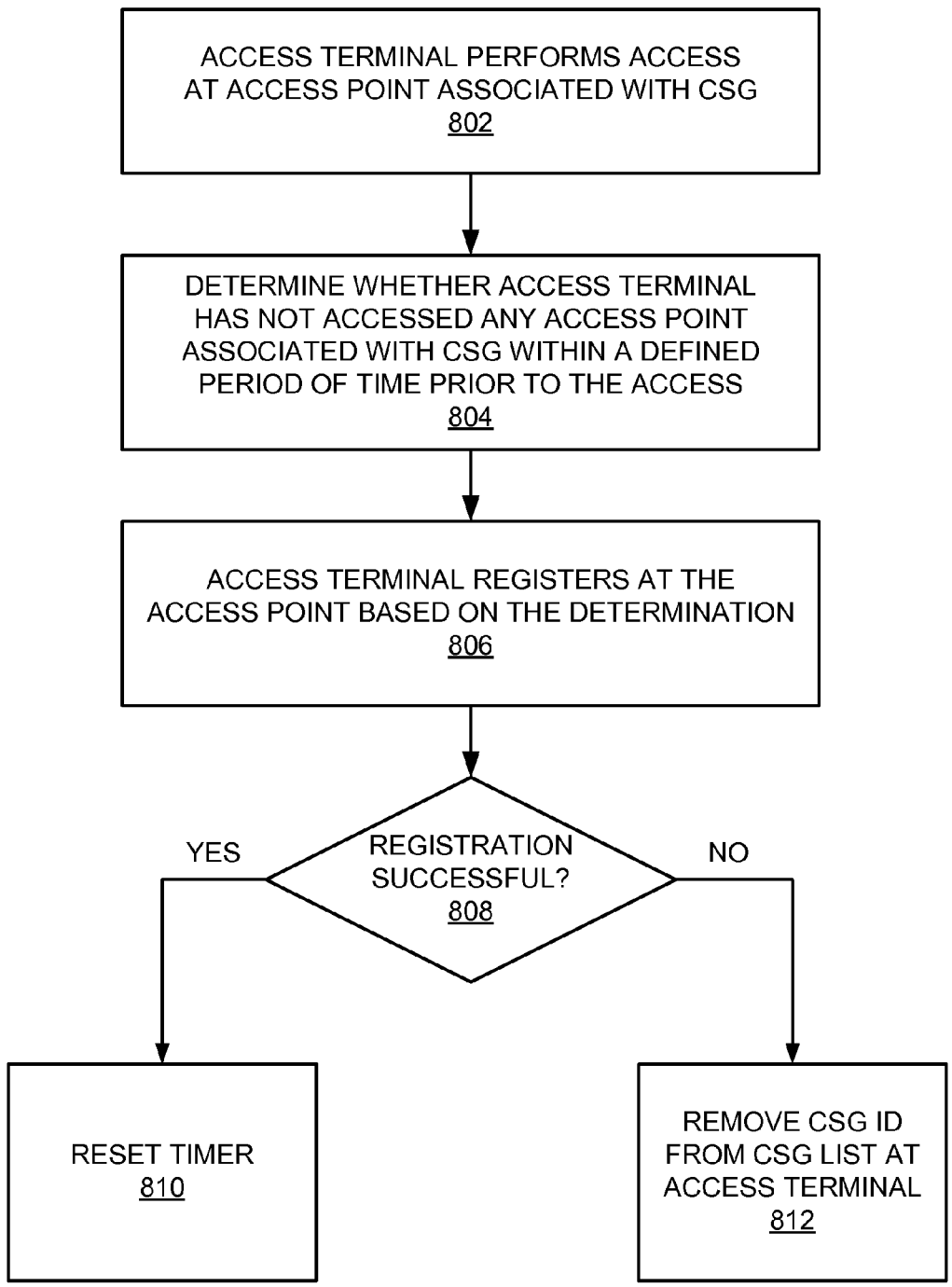
FIG. 8 is a flowchart of several sample aspects of operations that may be performed in conjunction with forcing registration by an access terminal that has not accessed an access point of a CSG for a defined period of time.

Referring now to FIGS. 6-8, in some cases a subscriber may be granted temporary membership to a CSG (e.g., by a CSG manager). Such a temporary membership may expire, for example, at a specified time or a defined period of time after the membership is established. Accordingly, expiration of the membership may be tracked by the network through the use of a CSG timer and expiry time information stored in the CSG subscriber information.

Using the expiry time information in the CSG subscriber information makes it possible to ensure that the MME can page an access terminal correctly when the subscriber has been removed from the CSG or the timer has expired. For example, setting the CSG expiry time to an expired value may indicate that the access terminal has not updated its allowed CSG list after the access terminal was removed from a CSG or the CSG expired for a temporary membership.

The CSG timer functionality and expiry time information may be provided at multiple nodes (or entities) in the network. For example, separate timers may be maintained at the HSS and the MME. Here, when a temporary member (subscriber) is added to a CSG, the HSS may send the expiry time information to the MME (e.g., via the CSG subscriber information for the temporary subscriber).

The HSS may or may not inform the MME of the expiration of its CSG timer. For example, by not sending this information, the amount of communication between the entities may be reduced. However, an HSS may still include CSG IDs with an expired time in the CSG subscriber information the HSS sends to the MME.

The MME uses its CSG timer to control access of a CSG. For example, when an access terminal accesses an access point associated with a CSG (e.g., a CSG cell), the MME may check that the CSG ID of the access point corresponds to a CSG ID in the CSG subscriber information for that access terminal (subscriber), and also check that the expiration time, if present, is still valid (e.g., has not expired).

As discussed herein, in the event an access terminal accesses a closed CSG access point (e.g., a closed CSG cell) due to being paged at the CSG, initiating uplink data transfer, initiating a mobile originating call, or initiating a registration procedure such as LAU/RAU/TAU procedure (e.g. triggered by an automatic or manual reselection), if the CSG ID is not present in the CSG subscriber information or the timer has expired, then the MME may send a reject message with the appropriate error code. The access terminal may then remove the entry for this CSG from its CSG list.

When a CSG subscription has expired, the entry for this CSG in the CSG list of the access terminal may not yet have been removed, and that the access terminal may then camp on a CSG cell for that CSG in idle mode. To ensure that a page reaches the access terminal when paging optimization is performed as discussed herein, the MME may page the access terminal at all CSGs which are in the CSG subscriber information that advertise a TAI where the access terminal may be camped on. This paging may be performed regardless of whether CSG subscription(s) that are stored by the MME are expired or not.

The disclosure relates in some aspects to a scheme for controlling how long the network (e.g., HSS and MME) will store the CSG ID of an expired CSG (e.g., in the CSG subscriber information for a subscriber). Here, a network entity that maintains CSG subscriber information may remove a CSG ID from the CSG subscriber information for a given subscriber upon expiration of a first timer associated with a first defined period of time. In conjunction with these operations, a second timer may be employed at an access terminal to ensure that the access terminal does not camp on any access points associated with the CSG for too long (e.g., a second defined period of time) without attempting to register at one of these access points. Through the use of this scheme, the access terminal may be prevented from camping on one of these access points after the timer-induced removal of the CSG ID from the CSG subscriber information for that access terminal.

FIG. 6 illustrates a sample relationship between the two timers discussed above. Here, T1 is employed at the network and T2 is employed at the access terminal.

In this scheme, the access terminal is required to register at an access point for a CSG if it has not registered at any access point for that CSG for a certain period of time. In addition, the HSS and MME are required to keep the expired CSG information for a time period T1 (e.g., T1=1 day). As indicated in FIG. 6, time T1 commences upon determining that an access terminal (subscriber) is no longer a member of a CSG (e.g., due to removal from the CSG or expiration of a subscription). As long as the access terminal is required to register at an access point of a CSG whenever the access terminal has not accessed such an access point in at least time T1, then after time T1, the network can safely remove the CSG ID for that CSG from the CSG subscriber information for that access terminal.

The second time period T2 (where T1>T2) is employed such that the access terminal is required to register if it has not seen an access point of that CSG in at least time T2. For example, as indicated in FIG. 6, the timer for T2 may commence at the last non-access stratum (NAS) message sent by the access terminal to an access point of the CSG. If the access terminal has not accessed (e.g., sent a NAS message to) an access point of that CSG before time T2 expires, the access terminal will be required to register at such an access point if the access terminal reselects to the access point. The access point will still page the access terminal for time T1, so that an access terminal that miscalculates time T2 can be off by up to time T1−T2 and still be reachable for paging.

If the access terminal reselects to the CSG before time T2 has expired, the access terminal is not required to register and will be paged. An access terminal that does register will be rejected and will remove the CSG ID from its CSG list as discussed herein. An access terminal that reselects to the CSG after time T2 has expired shall register and will be rejected and remove the CSG ID from its CSG list.

FIG. 7 describes sample operations that may be performed at the network in conjunction with using a CSG timer to determine when to delete CSG information for a subscriber at the network. Except where noted, these operations may be performed at multiple network entities (e.g., at an HSS and at an MME).

As represented by block 702, at some point in time it is determined that a subscriber is no longer a member of a CSG (e.g., due to removal or subscription expiration). For example, as discussed above at blocks 302 and 306, an HSS may receive an appropriate indication from a CSG manager or an MME may receive an appropriate indication from an HSS.

As represented by block 704, a CSG timer is set (e.g., started) as a result of the determination of block 702. Thus, in the example of FIG. 6, time T1 is commenced. Here, the network (e.g., the HSS and the MME) may maintain the CSG ID for the CSG in the CSG subscription information for the subscriber for up to a defined period of time (e.g., time T1 of FIG. 6).

As represented by block 706, it may subsequently be determined that the CSG timer has expired. For example, it may be determined that an access terminal for the subscriber has not accessed any access point associated with the CSG for a defined period of time after the setting of the timer. Here, an access may take various forms. In some cases an access is defined as the sending of a NAS message. For example, a determination that the access terminal has not sent a NAS message to an access point may involve determining that the access terminal has not registered at the access point, has not performed an attach procedure at the access point, and has not sent a service request to the access point.

As represented by block 708, if the timer has expired, the CSG ID for the CSG is removed from the CSG subscriber information maintained at the network. As discussed above, in some implementations, the network entities may independently maintain their CSG ID information (at least to some degree). For example, the HSS may not inform the MME when it removes the CSG ID from its CSG subscriber information, and vice versa. Alternatively, in other implementations, the HSS may send a message to the MME requesting that the CSG ID be removed (block 710).

FIG. 8 describes sample operations that may be performed at an access terminal in conjunction with using a CSG timer to ensure that the access terminal periodically registers at an access point of a CSG. Here, the access terminal may track, for each CSG in its CSG list, whether or not the access terminal has performed a NAS procedure at the CSG for a defined period of time (e.g., time T2 of FIG. 6).

As represented by block 802, at some point in time, the access terminal may perform an access (e.g., send a NAS message to) at an access point associated with a CSG. The access terminal may thus start (e.g., reset) time T2 for that CSG.

As represented by block 804, in the event the access terminal reselects to an access point associated with the CSG, the access terminal determines whether it has accessed any access point associated with that CSG within a defined period of time prior to the access. For example, the access terminal may determine whether timer T2 has expired (e.g., where time T2 for a given CSG is reset any time there is an access of an access point of the CSG).

As represented by block 806, the access terminal registers at the access point based on the determination of block 804. For example, the access terminal will register if T2 expired. Thus, the access terminal will not be allowed to camp on the access point for an extended period of time without registering. At block 808, the access terminal determines whether the registration was successful.

If the registration was successful, this indicates that the network has not removed the CSG ID from the CSG subscriber information for the access terminal In this case, the access terminal may reset the timer at block 810.

If the registration was not successful, this indicates that the network has removed the CSG ID from the CSG subscriber information for the access terminal In this case, the access terminal may remove the CSG ID from its CSG list at block 812.

Also, as a fail-safe procedure, if the access terminal is powered down or somehow loses track of the time, the access terminal could automatically set all entries in the CSG list to indicate that the timer has expired.

Figure 9:
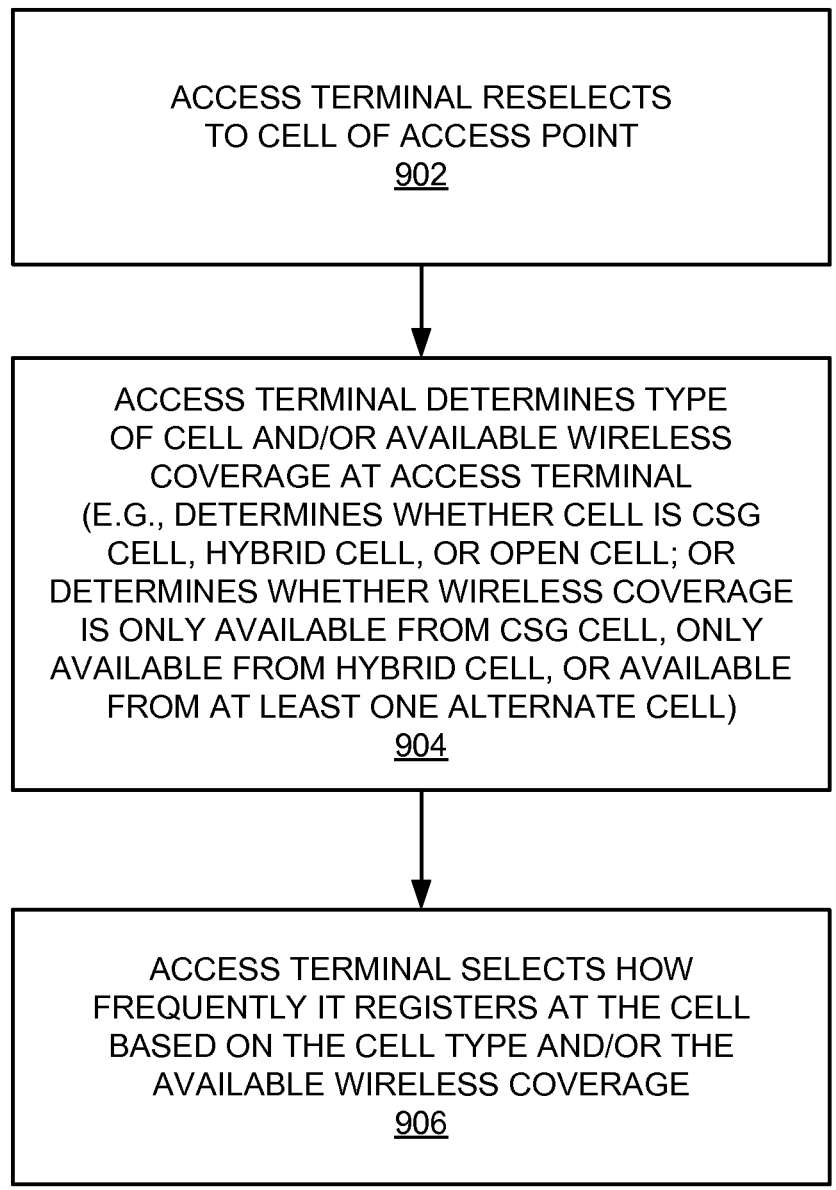
FIG. 9 is a flowchart of several sample aspects of operations that may be performed in conjunction with changing how frequently an access terminal registers.

Referring now to FIG. 9, in some implementations is may be desirable to allow an access terminal to change how often it registers based on one or more criteria. For example, it may be useful in general to register more frequently at a CSG cell or a hybrid cell than at an open cell. Also, if the CSG cell or hybrid cell is the only available coverage in a region, then the access terminal may register whenever reselecting to that cell and at a reasonably small interval. This may be done, for example, to ensure that the access terminal is still a member of the CSG cell or hybrid. Here, if the access terminal is not still a member, the access terminal would be out of coverage in this region. Accordingly, it may not be good policy to display to a user that they are in coverage when in fact this is not the case. When alternative coverage is available, it may not be necessary to register as often. Here, even if the access terminal's membership expires or is removed, the access terminal will still be able to access elsewhere (i.e., the access terminal will still be in coverage).

FIG. 9 illustrates sample operations that may be performed by an access terminal to select how often it registers. As represented by block 902, at some point in time, the access terminal reselects to a cell of an access point. As represented by block 904, the access terminal may determine one or more criteria for selecting how often registration should occur. For example, the access terminal may determine a type of the cell (e.g., CSG cell, a hybrid cell, or an open cell). Alternatively, or in addition, the access terminal may determine the available wireless coverage at the access terminal (e.g., whether wireless coverage is only available from a CSG cell, only available from a hybrid cell, or available from at least one alternate cell). As represented by block 906, the access terminal selects how frequently it registers at the cell based on the determination of block 904 (e.g., based on the cell type and/or available wireless coverage).

Figure 10:
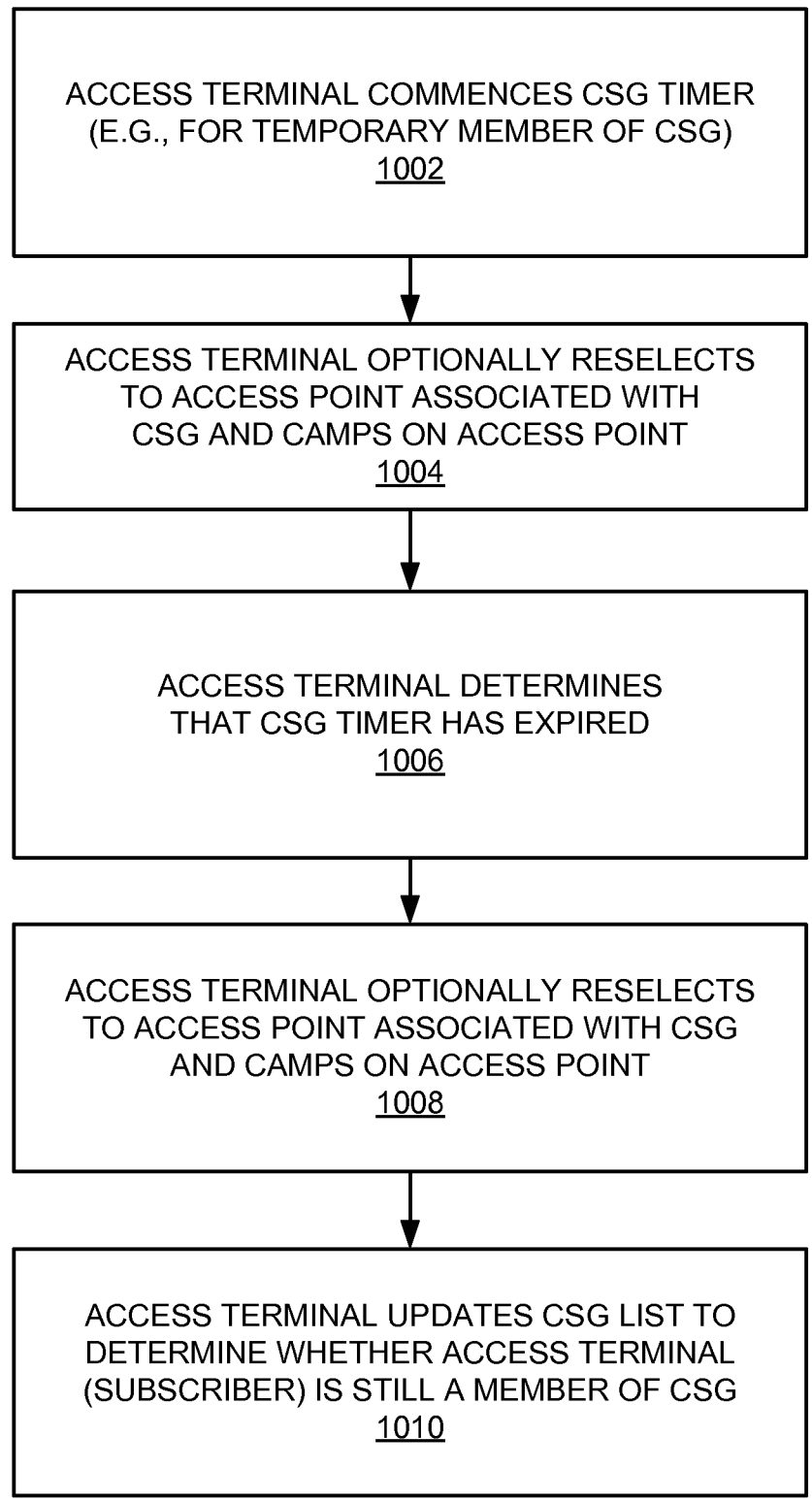
FIG. 10 is a flowchart of several sample aspects of operations that may be performed in conjunction with determining whether a temporary member of a CSG is still a member of the CSG after expiration of a CSG subscription timer at an access terminal.
Figure 11:
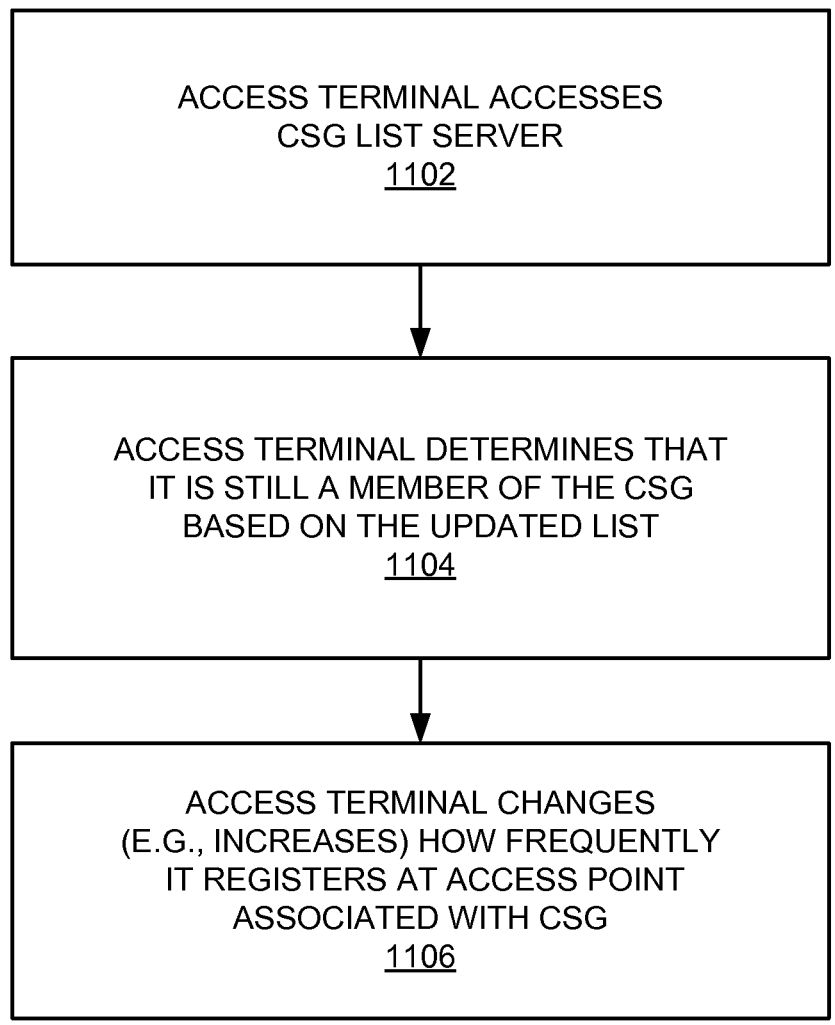
FIG. 11 is a flowchart of several sample aspects of operations that may be performed in conjunction with the updating of a CSG list at an access terminal.
Figure 12:
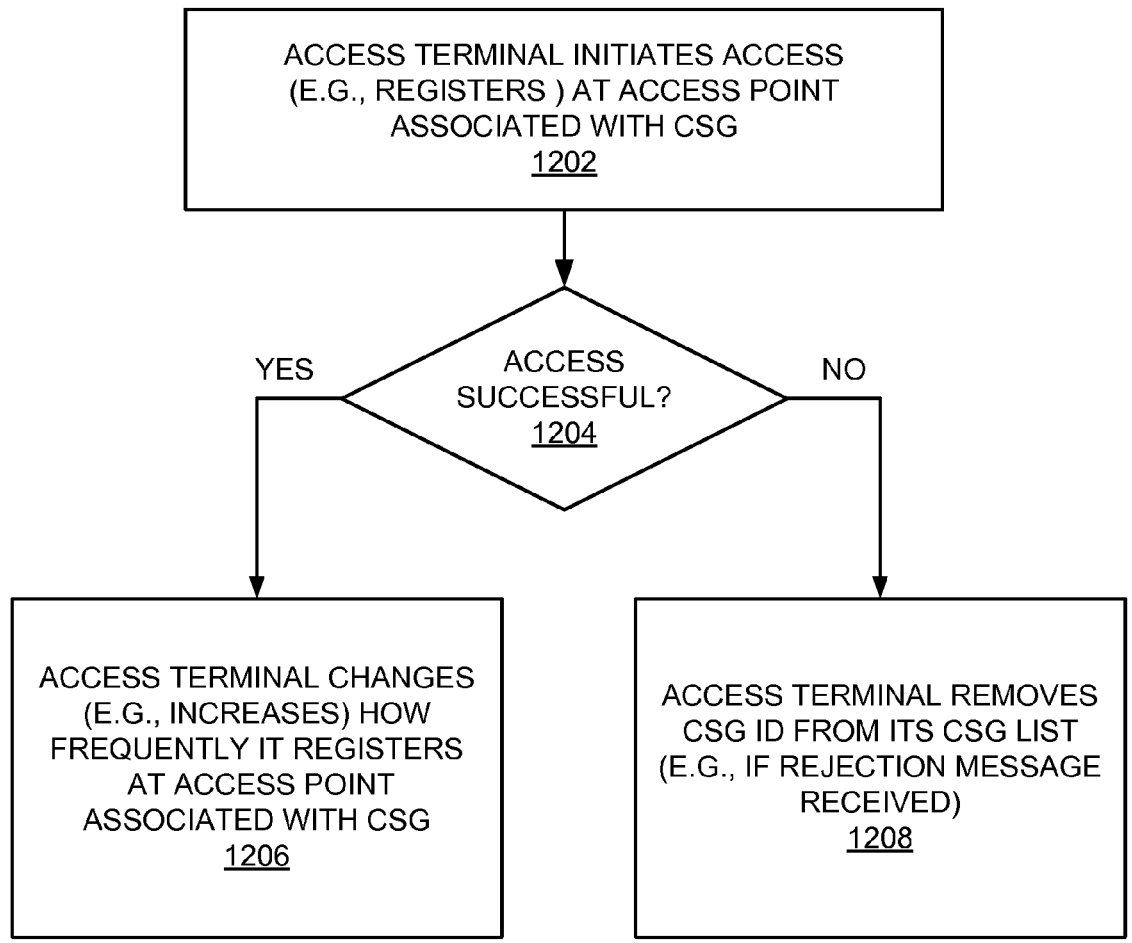
FIG. 12 is a flowchart of several sample aspects of operations that may be performed in conjunction with the updating of a CSG list at an access terminal.

Referring now to FIGS. 10-12, as mentioned above, an expiry time for temporary CSG members may be used at the network to indicate when the member's subscription has expired. Here, to avoid frequent updates of the CSG subscriber information, in some implementations, the MME and the HSS each independently remove their respective CSG entries once the membership time has expired. In addition, an access terminal may maintain its own timer for keeping track of when its subscription expires. However, it is possible that the time at which the network's timer expires will be different (e.g., later) than the time at which the access terminal's timer expires. Hence, an access terminal may still be a member of a CSG after that access terminal's timer expires. FIGS. 10-12 describe a scheme that enables an access terminal to determine whether it is still a member of a CSG after the access terminal's timer expires.

As represented by block 1002 of FIG. 10, upon being granted membership (e.g., temporary membership) at a CSG, the access terminal may commence a CSG timer. The UE may be informed of the expiry time in various ways. For example, the expiry time may be included in an allowed CSG management object in OMA-DM as well as the OTA update. The expiry time may also be included in the MME NAS signaling response to an attach procedure, a detach procedure, and location registration procedures (LAU/RAU/TAU). Including the expiry time in the NAS signaling response may be useful in the case of manual CSG selection.

As represented by block 1004, at some point in time, the access terminal may reselect to an access point associated with the CSG and then camp on that access point. Thus, block 1004 may represent in some aspects a scenario where the access terminal reselects to an access point and subsequently determines that its CSG timer has expired when camping on the access point.

As represented by block 1006, at some point in time, the access terminal determines that its CSG timer has expired. In some implementations the access terminal may display the expiration time to the user for information purposes. For example, the access terminal may warn the user when the timer is about to expire.

If the access terminal had not reselected to the access point at block 1004, the access point may reselect to the access point at block 1008. Thus, block 1008 may represent in some aspects a scenario where the access terminal determines that its CSG timer has expired then reselects to an access point and camps on the access point before determining whether it is still a member of the CSG.

As represented by block 1010, as a result of the determination of block 1006, the access terminal takes an appropriate action to update its CSG list to determine whether it is still a member of the CSG. As noted above, the access terminal may still be a member of the CSG if the network's timer expires later than the access terminal's timer. For example the access terminal's clock may not be set correctly or may not be synchronized with the network's clock. Accordingly, since the access terminal may not have the correct time information, it may determine not to immediately remove the CSG ID from its CSG list upon expiration of its timer. FIGS. 11 and 12 describe two different actions that may be performed at block 1010.

FIG. 11 relates to a scenario where the access terminal communicates with a CSG list server to determine whether the access terminal is still a member of the CSG. As represented by block 1102, as a result of the determination of block 1006, the access terminal accesses the CSG list server (e.g., via OMA-DM or OTA signaling) to obtain an updated CSG list (e.g., allowed CSG list) from the network. In some cases, the access terminal may access the CSG list server via an access point that is not associated with the CSG. As represented by block 1104, the access terminal may then determine that it is still a member of the CSG based on the updated list (e.g., based on the presence of the CSG ID in the CSG list). As represented by block 1106, in some implementations, the access terminal may change how frequently its registers as a result of the determination of block 1104. For example, the access terminal may register more frequently than is required for regular registration to ensure that the CSG is removed from the CSG list as soon as possible after the timer expires.

FIG. 12 relates to a scenario where the access terminal accesses an access point of the CSG to determine whether the access terminal is still a member of the CSG. For example, if the access terminal reselects to the access point or is currently camped on the access point in idle mode, the access terminal may perform a registration such as an attach or tracking area update. If the timer has expired on the network as well, the MME may reject the access terminal with an appropriate rejection code (not authorized for this CSG) and the access terminal will remove the CSG ID from the CSG list at the access terminal. As another example, if the access terminal is connected to the access point, the access terminal may perform a tracking area update (TAU). If the timer has expired on the network as well, then the MME will reject the access terminal and the CSG ID will be removed from the access terminal's CSG list.

Referring now to the operations of FIG. 12, as represented by block 1202, as a result of the determination of block 1006, the access terminal initiates access (e.g., registers) at an access point associated with the CSG. As represented by block 1204, the access terminal determines whether the access (e.g., registration) was successful. If the access was successful, at block 1206 the access terminal may change how frequently it registers (e.g., as described above at block 1106). If the access was not successful, the access terminal removes the CSG ID from its CSG list (block 1208).

Figure 13A:
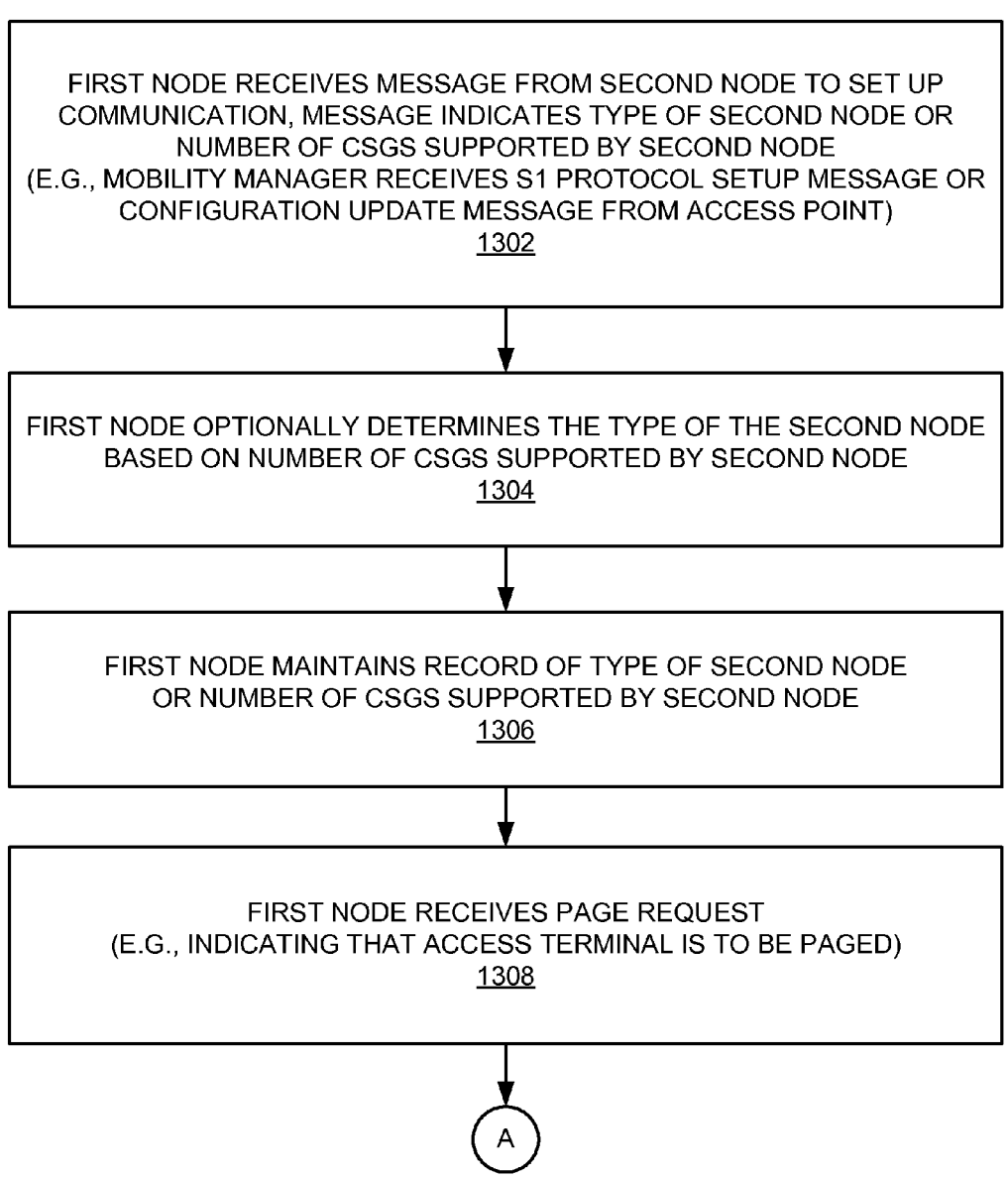
FIGS. 13A and 13B are a flowchart of several sample aspects of operations that may be performed in conjunction with determining whether to include an allowed CSG list in a page message.
Figure 13B:
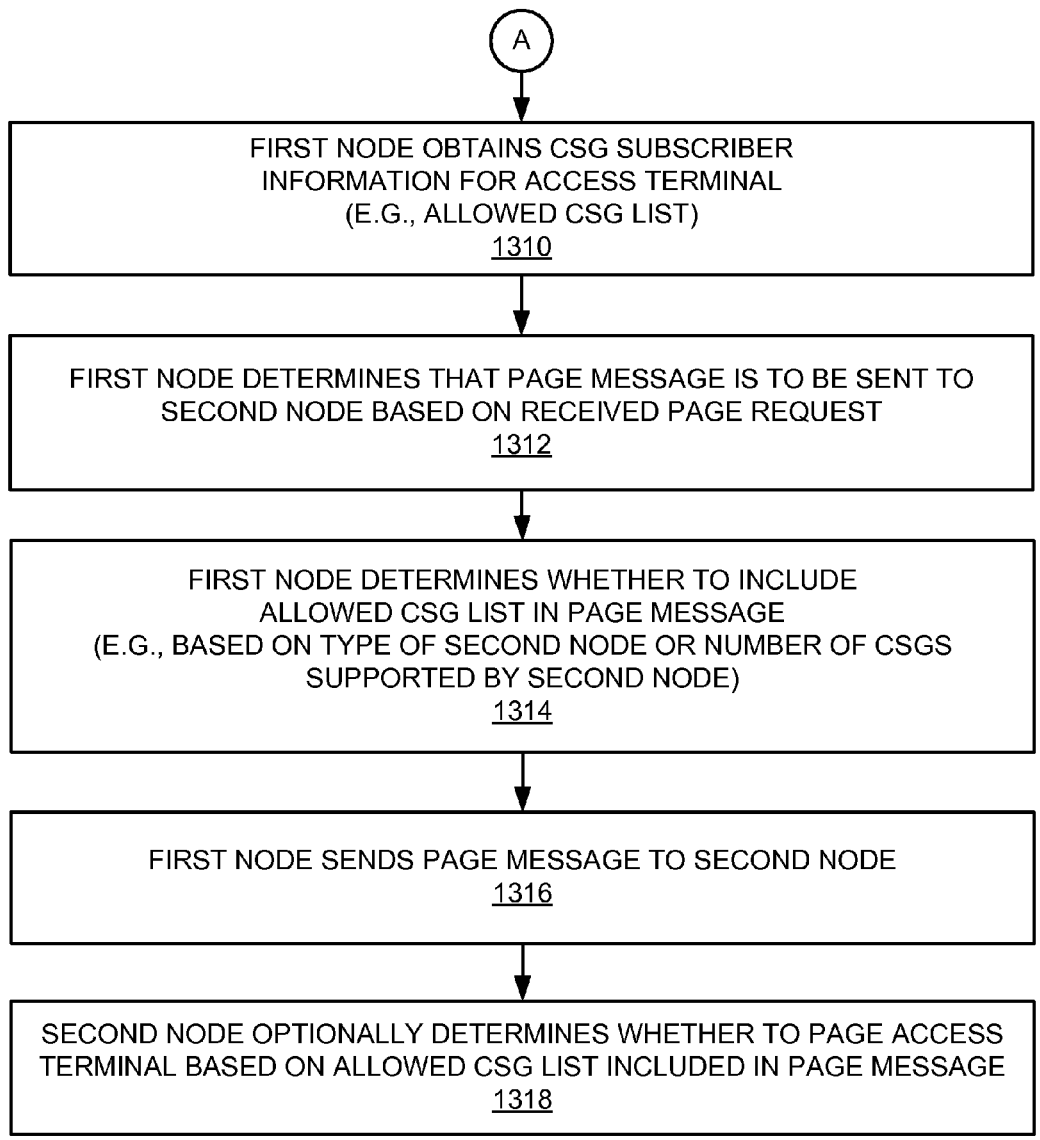
Figure 14:
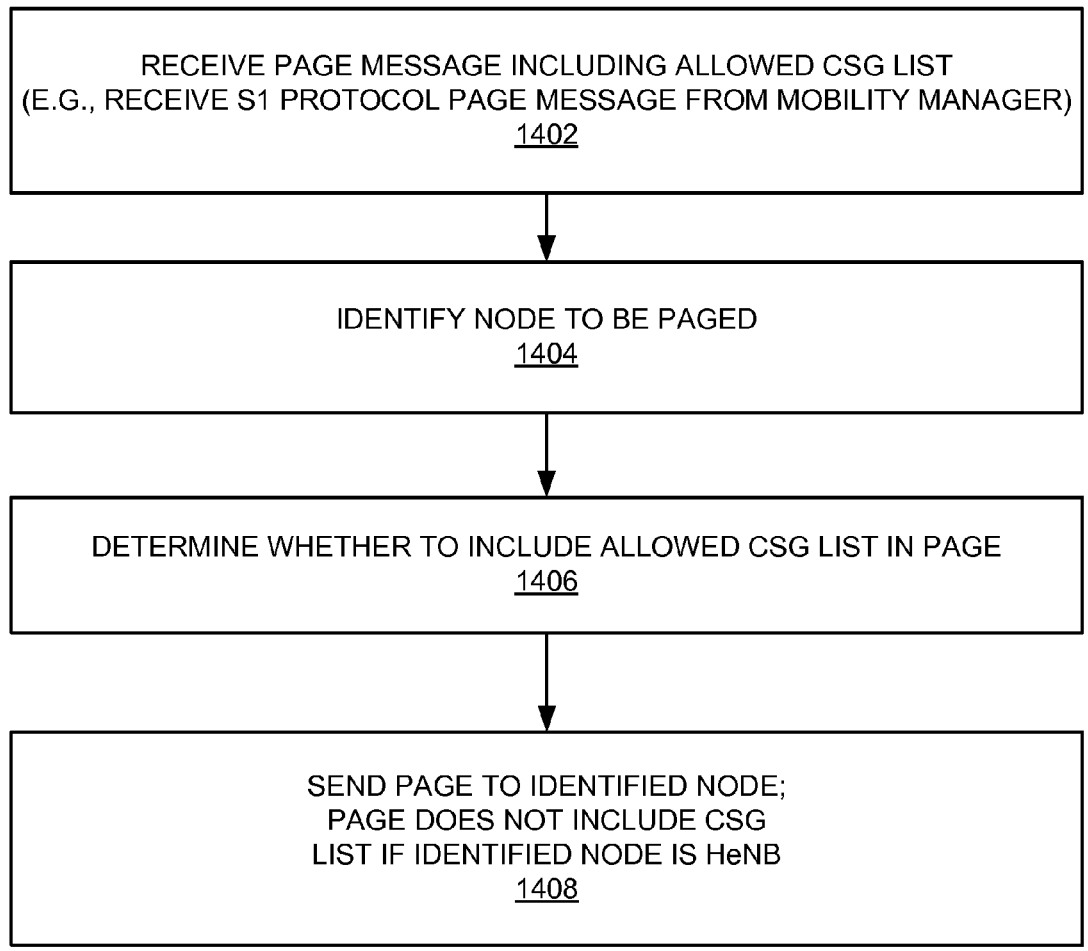
FIG. 14 is a flowchart of several sample aspects of operations that may be performed in conjunction with determining whether to include an allowed CSG list in a page message.

Referring now to FIGS. 13A-14, in some implementations allowed CSG list information (e.g., a CSG whitelist) is selectively included in a page message based on the destination for the page message.

In some cases, a determination to include the allowed CSG list is based on a type of the destination node. For example, an allowed CSG list may be sent to eNodeBs and access point gateways (e.g., HeNB-GWs), but not to HeNBs.

In some cases, a determination to include the allowed CSG list is based on how many CSGs are supported by the destination node. In some aspects, the number of supported CSGs may serve as indication of the type of the destination node. For example, if a node only supports a single CSG, it may be assumed that the node is a HeNB. Hence, an allowed CSG list may not be included in a page to such a node. In contrast, if a node supports multiple CSGs, it may be assumed that the node is not a HeNB (e.g., the node is a HeNB-GW or an eNodeB). Hence, an allowed CSG list may be included in a page to such a node.

FIGS. 13A and 13B describe sample operations that may be performed by a first node (e.g., an MME) to send a page message to a second node (e.g., eNB, HeNB, or HeNB-GW).

As represented by block 1302 of FIG. 13A, at some point in time, the first node receives a message from the second node to setup communication between the nodes. This message also indicates a type of the second node or the number of CSGs supported by the second node. This message may take various forms such as, for example, an S1 protocol setup message or a configuration message (e.g., containing configuration update information for the second node).

As represented by block 1304, if not known, in cases where the message indicates the number of CSGs supported by the second node, the first node may optionally determine a type of the second node based on the number of CSGs supported by the second node. For example, the first node may determine that the second node is a HeNB if the message indicates that the second node only supports a single CSG.

As represented by block 1306, the first node maintains a record of the type of the second node or the number of CSGs supported by the second node. For example, the first node may store this information in a memory device.

As represented by block 1308, at some point in time, the first node receives a page request message. The page request message may indicate that the access terminal is to be paged. In addition, as represented by block 1310 of FIG. 13B, the first node may obtain CSG subscriber information (e.g., the allowed CSG list) for the access terminal.

As represented by block 1312, in some cases the first node will determine, based on the received page request, that a page message is to be sent to the second node. Accordingly, as represented by block 1214, the first node will determine whether to include the allowed CSG list for the access terminal in the page message to be sent to the second node. As discussed above, this determination may be based on the type of the second node or the number of CSGs supported by the second node.

As represented by block 1316, the first node sends the page message to the second node. As represented by block 1318, the second node may then determine whether to page the access terminal based on an allowed CSG list included in the page message, if applicable. For example, the second node may determine based on the allowed CSG list that the access terminal cannot access the second node. In this case, the second node may elect to not page the access terminal.

FIG. 14 relates to an implementation where an access point gateway (e.g., HeNB-GW) determines whether to include an allowed CSG list in a page message sent to a node. As represented by block 1402, the access point gateway receives a page message that includes an allowed CSG list for the access terminal to be paged. For example, the access point gateway may receive an S1 protocol page from an MME. As represented by block 1404, the access point gateway identifies a node to be paged based on the received page message. As represented by block 1406, the access point gateway determines whether to include the allowed CSG list in the page to be sent to the node. Here, if the identified node is a HeNB, the access point gateway will not include the allowed CSG list in the page. As represented by block 1408, the access point gateway then sends the page to the identified node.

Figure 15:
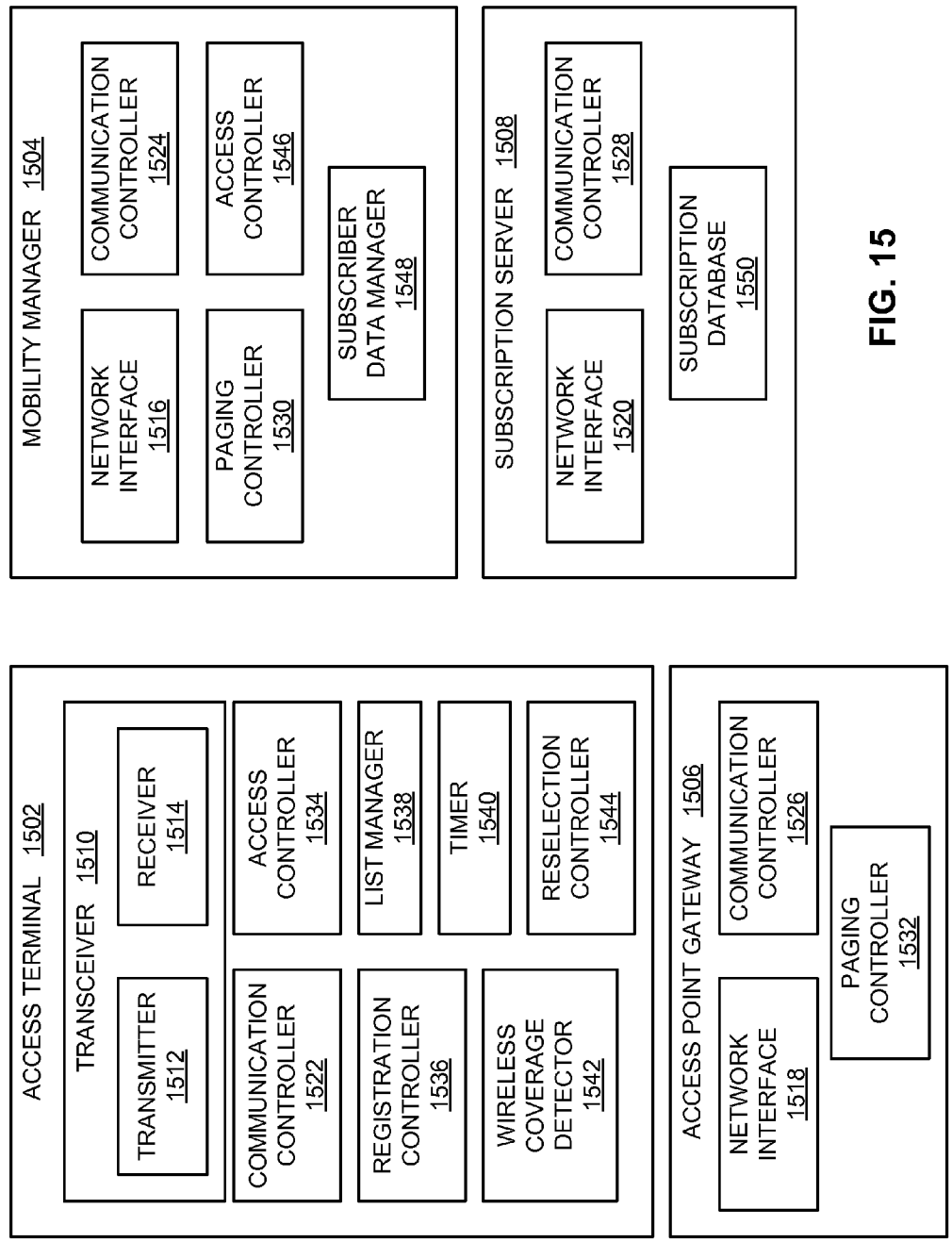
FIG. 15 is a simplified block diagram of several sample aspects of components that may be employed in communication nodes.

FIG. 15 illustrates several sample components that may be incorporated into nodes such as an access terminal 1502 (e.g., corresponding to the access terminal 102), a mobility manager 1504 (e.g., corresponding in some aspects to the network node 108), an access point gateway 1506 (e.g., corresponding in some aspects to the network node 108), and a subscription server 1508 (e.g., corresponding in some aspects to the network node 108), to perform operations as taught herein. The described components also may be incorporated into other nodes in a communication system. For example, other nodes in a system may include components similar to those described for the nodes 1502-1508 to provide similar functionality. A given node may contain one or more of the described components. For example, an access terminal may contain multiple transceiver components that enable the access terminal to operate on multiple frequencies and/or communicate via different technologies.

As shown in FIG. 15, the access terminal 1502 includes a transceiver 1510 for communicating with other nodes. The transceiver 1510 includes a transmitter 1512 for sending signals (e.g., messages) and a receiver 1514 for receiving signals.

In some implementations, the mobility manager 1504, the access point gateway 1506, and the subscription server 1508 may include network interfaces 1516, 1518, and 1520, respectively, for communicating with one another and with other network nodes. For example, the network interfaces 1516, 1518, and 1520 may be configured to communicate with one or more network nodes via a wired or wireless backhaul.

The nodes 1502-1508 also include other components to perform the operations taught herein. For example, the nodes 1502-1508 may include communication controllers 1522-1528, respectively, for managing communication with other nodes (e.g., sending and receiving messages and indications) and for providing other related functionality as taught herein. In cases where two or more of the nodes 1504-1508 represent entities that may be co-located, the communication controller may, for example, provide functionality to facilitate inter-process communication between the entities (e.g., by passing data from one process to another). The access terminal 1502 may include an access controller 1534 for controlling access operations (e.g., performing an access at an access point) and for providing other related functionality as taught herein. The access terminal 1502 may include a registration controller 1536 for controlling registration operations (e.g., registering at an access point, resetting a timer if registration is successful, determining a cell type, selecting how frequently the access terminal registers, increasing how frequently the access terminal registers, determining that an access was successful) and for providing other related functionality as taught herein. The access terminal 1502 may include a list manager 1538 for managing one or more CSG lists (e.g., removing a CSG ID from a CSG list, updating a CSG list, determining that a subscriber is still a member of a CSG) and for providing other related functionality as taught herein. The access terminal 1502 may include a timer 1540 for performing timing operations (e.g., determining that the access terminal has not accessed an access point within a defined period of time, determining that a timer value has expired) and for providing other related functionality as taught herein. The access terminal 1502 may include a wireless coverage detector 1542 for detecting wireless coverage (e.g., determining available wireless coverage for the access terminal) and for providing other related functionality as taught herein. The access terminal 1502 may include a reselection controller 1544 for controlling reselection operations (e.g., reselecting to a cell or access point) and for providing other related functionality as taught herein. The mobility manager 1504 may include a paging controller 1530 for controlling paging-related operations (e.g., determining that an access terminal is to be paged, paging the access terminal, determining whether to include a CSG list in a page message, receiving a page request message, determining that a page message is to be sent to a node, sending a page message) and for providing other related functionality as taught herein. The mobility manager 1504 may include an access controller 1546 for controlling access operations (e.g., rejecting an attempted access by an access terminal) and for providing other related functionality as taught herein. The mobility manager 1504 may include a subscriber data manager 1548 for managing subscription information (e.g., removing a CSG ID from CSG subscriber information, setting a timer, determining that the timer expired, removing a CSG ID based on the expiration) and for providing other related functionality as taught herein. The access point gateway 1506 may include a paging controller 1532 for controlling paging-related operations (e.g., identifying a node to be paged, sending a page) and for providing other related functionality as taught herein. Finally, the subscription server 1508 may include a subscription database 1550 for storing and managing subscriber information (e.g., determining that a subscriber is no longer a member of a CSG, setting an indication that a subscriber is no longer a member of a CSG, removing a CSG ID from CSG subscriber information, setting a timer, determining that the timer expired, removing a CSG ID based on the expiration) and for providing other related functionality as taught herein.

For convenience the nodes 1502-1508 are shown in FIG. 15 as including components that may be used in the various examples described herein. In practice, one or more of the illustrated components may not be used in a given example. As an example, in some implementations the access terminal 1502 may not comprise the wireless coverage detector 1542. Also, one or more of the illustrated components may provide different functionality in different implementations. As an example, in some implementations the paging controller 1530 may perform operations as described in FIGS. 3A and 3B and in some implementations the paging controller 1530 may perform operations as described in FIGS. 13A and 13B.

Also, in some implementations the components of FIG. 15 may be implemented in one or more processors (e.g., that uses and/or incorporates data memory for storing information or code used by the processor(s) to provide this functionality). For example, the functionality of blocks 1522 and 1534-1544 may be implemented by a processor or processors of an access terminal and data memory of the access terminal (e.g., by execution of appropriate code and/or by appropriate configuration of processor components). Similarly, the functionality of the blocks of the mobility manager 1504 may be implemented by a processor or processors of a mobility manager and data memory of the mobility manager (e.g., by execution of appropriate code and/or by appropriate configuration of processor components). Also, the functionality of the blocks of the access point gateway 1506 may be implemented by a processor or processors of an access point gateway and data memory of the access point gateway (e.g., by execution of appropriate code and/or by appropriate configuration of processor components). Furthermore, the functionality of the blocks of the subscription server 1508 may be implemented by a processor or processors of a subscription server and data memory of the subscription server (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 16:
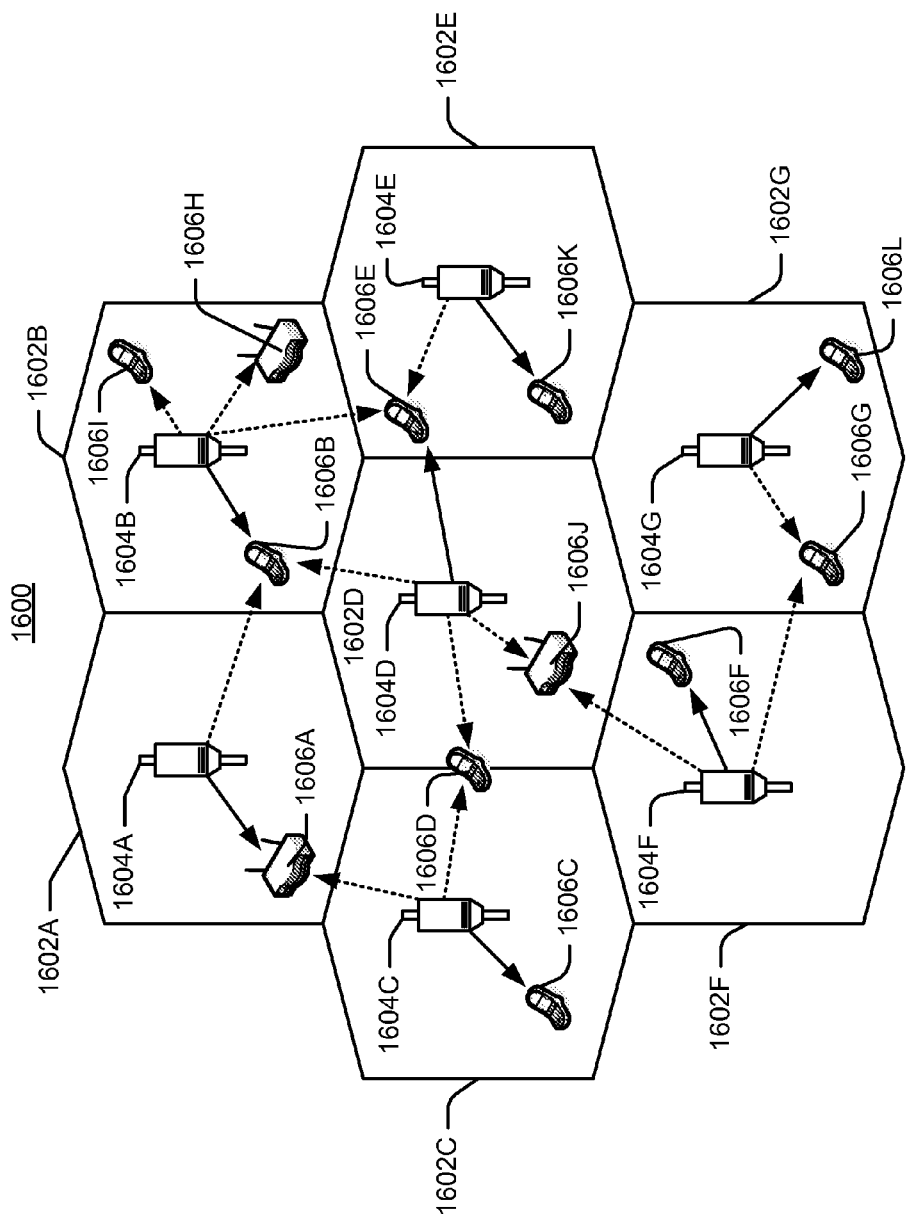
FIG. 16 is a simplified diagram of a wireless communication system.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access point 1604 (e.g., access points 1604A-1604G). As shown in FIG. 16, access terminals 1606 (e.g., access terminals 1606A-1606L) may be dispersed at various locations throughout the system over time. Each access terminal 1606 may communicate with one or more access points 1604 on a forward link (FL) and/or a reverse link (RL) at a given moment, depending upon whether the access terminal 1606 is active and whether it is in soft handoff, for example. The wireless communication system 1600 may provide service over a large geographic region. For example, macro cells 1602A-1602G may cover a few blocks in a neighborhood or several miles in rural environment.

Figure 17:
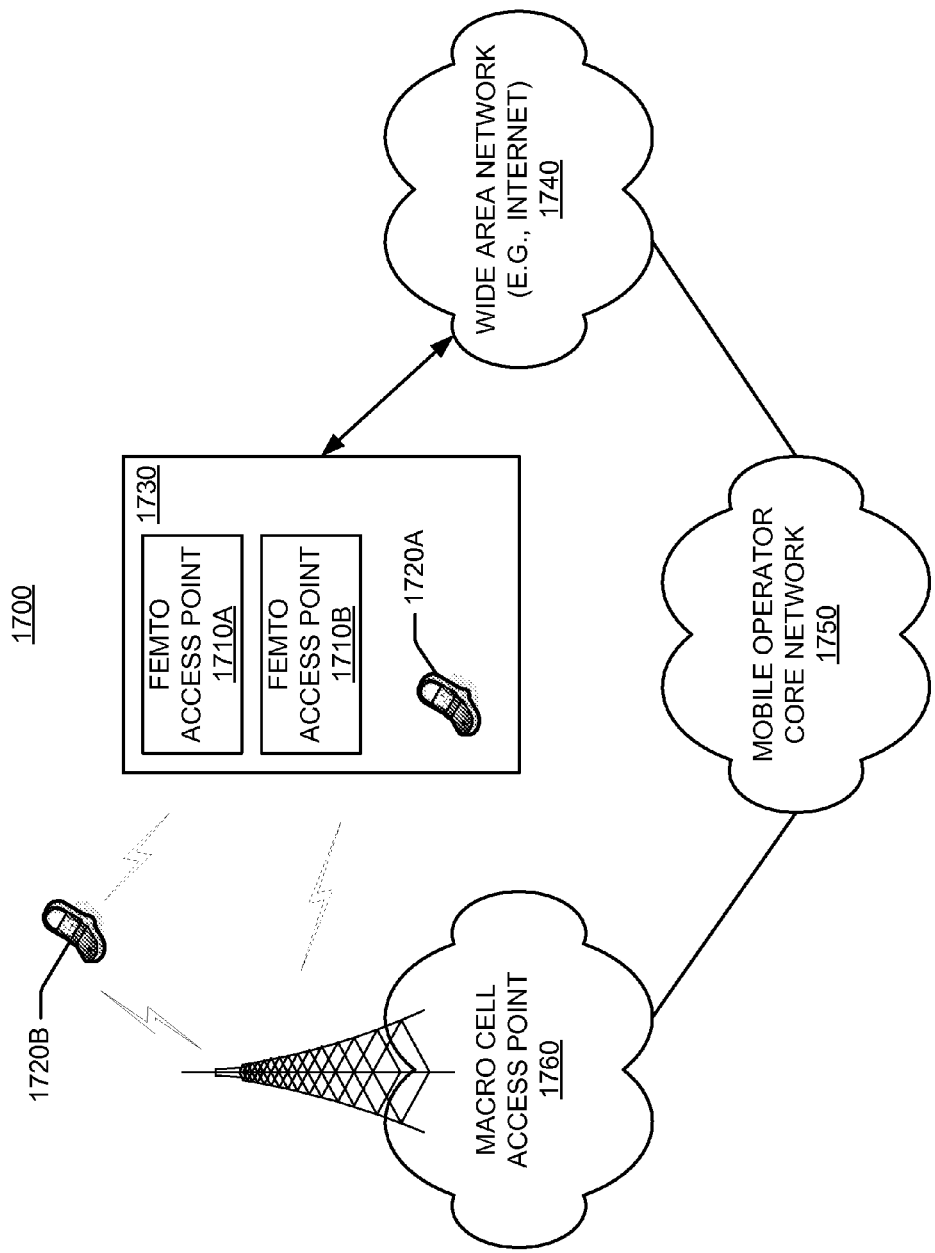
FIG. 17 is a simplified diagram of a wireless communication system including femto nodes.

FIG. 17 illustrates an exemplary communication system 1700 where one or more femto access points are deployed within a network environment. Specifically, the system 1700 includes multiple femto access points 1710 (e.g., femto access points 1710A and 1710B) installed in a relatively small scale network environment (e.g., in one or more user residences 1730). Each femto access point 1710 may be coupled to a wide area network 1740 (e.g., the Internet) and a mobile operator core network 1750 via a DSL router, a cable modem, a wireless link, or other connectivity means (not shown). As will be discussed below, each femto access point 1710 may be configured to serve associated access terminals 1720 (e.g., access terminal 1720A) and, optionally, other (e.g., hybrid or alien) access terminals 1720 (e.g., access terminal 1720B). In other words, access to femto access points 1710 may be restricted whereby a given access terminal 1720 may be served by a set of designated (e.g., home) femto access point(s) 1710 but may not be served by any non-designated femto access points 1710 (e.g., a neighbor's femto access point 1710).

Figure 18:
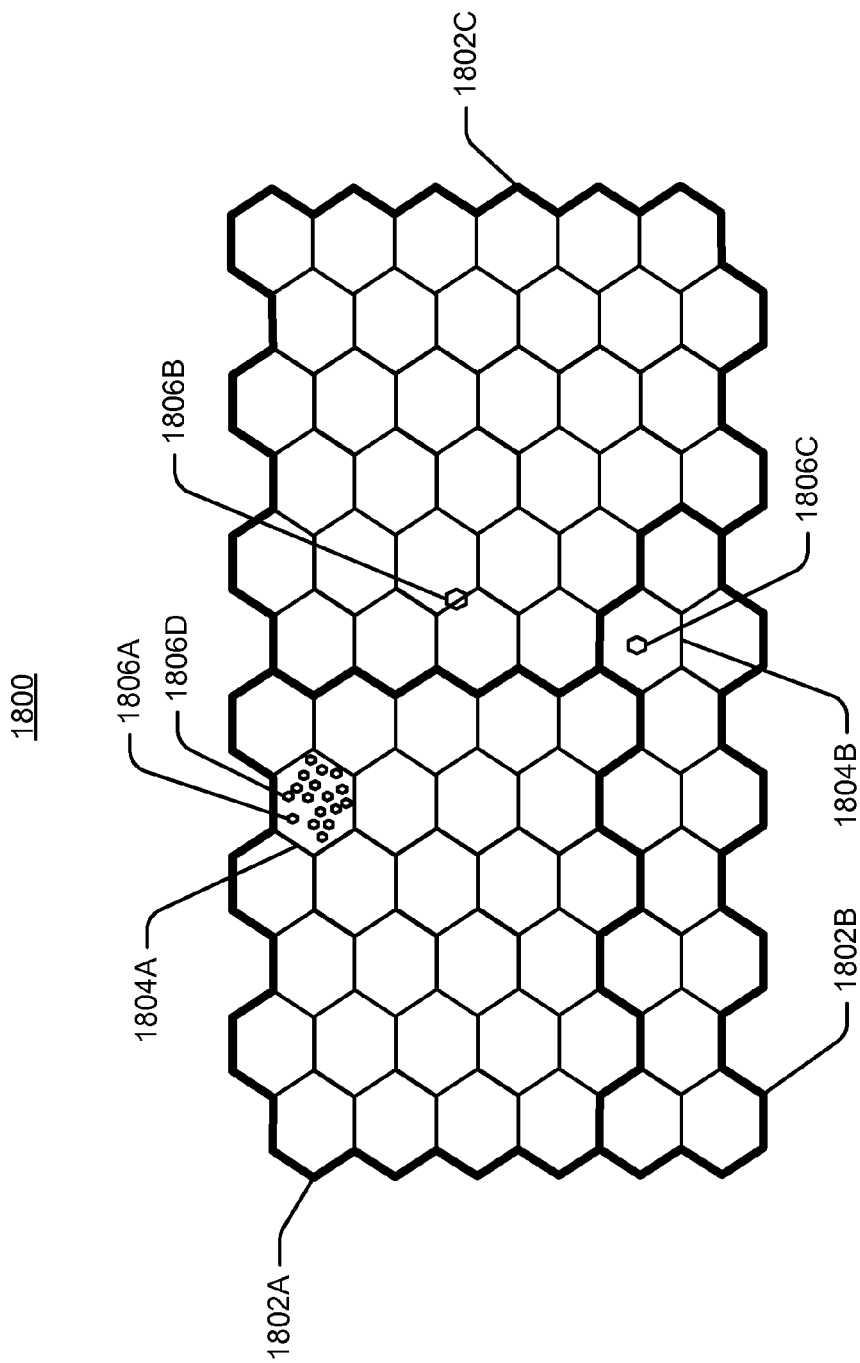
FIG. 18 is a simplified diagram illustrating coverage areas for wireless communication.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the larger hexagons. The tracking areas 1802 also include femto coverage areas 1806. In this example, each of the femto coverage areas 1806 (e.g., femto coverage area 1806C) is depicted within one or more macro coverage areas 1804 (e.g., macro coverage area 1804B). It should be appreciated, however, that some or all of a femto coverage area 1806 may not lie within a macro coverage area 1804. In practice, a large number of femto coverage areas 1806 may be defined with a given tracking area 1802 or macro coverage area 1804. Also, one or more pico coverage areas (not shown) may be defined within a given tracking area 1802 or macro coverage area 1804.

Referring again to FIG. 17, the owner of a femto access point 1710 may subscribe to mobile service, such as, for example, 3G mobile service, offered through the mobile operator core network 1750. In addition, an access terminal 1720 may be capable of operating both in macro environments and in smaller scale (e.g., residential) network environments. In other words, depending on the current location of the access terminal 1720, the access terminal 1720 may be served by a macro cell access point 1760 associated with the mobile operator core network 1750 or by any one of a set of femto access points 1710 (e.g., the femto access points 1710A and 1710B that reside within a corresponding user residence 1730). For example, when a subscriber is outside his home, he is served by a standard macro access point (e.g., access point 1760) and when the subscriber is at home, he is served by a femto access point (e.g., access point 1710A). Here, a femto access point 1710 may be backward compatible with legacy access terminals 1720.

A femto access point 1710 may be deployed on a single frequency or, in the alternative, on multiple frequencies. Depending on the particular configuration, the single frequency or one or more of the multiple frequencies may overlap with one or more frequencies used by a macro access point (e.g., access point 1760).

In some aspects, an access terminal 1720 may be configured to connect to a preferred femto access point (e.g., the home femto access point of the access terminal 1720) whenever such connectivity is possible. For example, whenever the access terminal 1720A is within the user's residence 1730, it may be desired that the access terminal 1720A communicate only with the home femto access point 1710A or 1710B.

In some aspects, if the access terminal 1720 operates within the macro cellular network 1750 but is not residing on its most preferred network (e.g., as defined in a preferred roaming list), the access terminal 1720 may continue to search for the most preferred network (e.g., the preferred femto access point 1710) using a better system reselection (BSR) procedure, which may involve a periodic scanning of available systems to determine whether better systems are currently available and subsequently acquire such preferred systems. The access terminal 1720 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1710, the access terminal 1720 selects the femto access point 1710 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1710 that reside within the corresponding user residence 1730). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

While the above discussion refers in some aspects to CSGs, the teachings herein are generally applicable to any wireless cell set that comprises a set of one or more cells (e.g., at least one access point) where there is a defined relationship specific to that set. Thus, a CSG is but one example of a wireless cell set. It should be appreciated, therefore, that the concepts described herein may be applicable to other types of defined sets or groups of wireless cells or other similar entities.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service. For example, some access terminals (e.g., non-members) may be allowed partial and/or temporary access while other access terminals (e.g., members) may be allowed preferential access (e.g., full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 19:
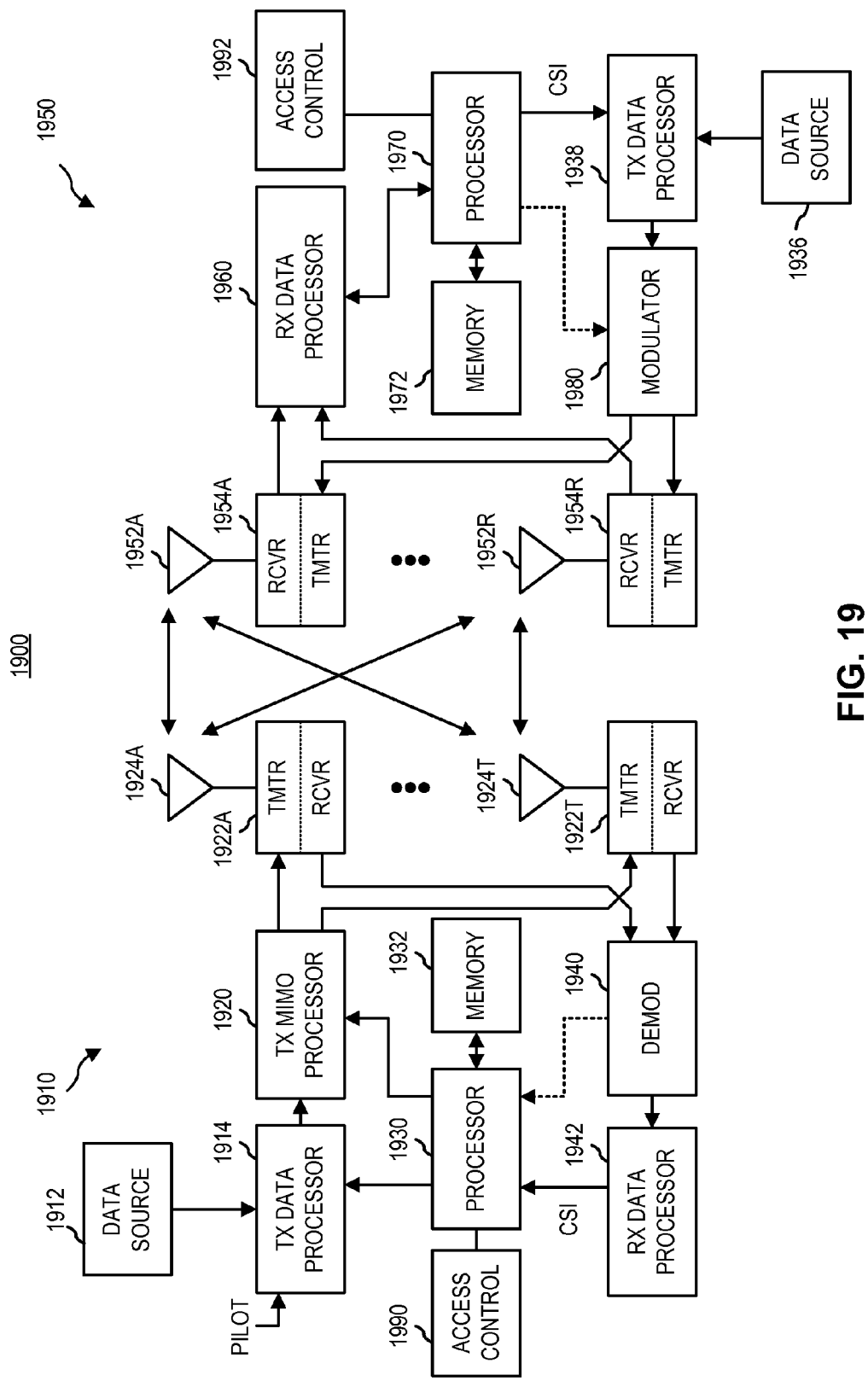
FIG. 19 is a simplified block diagram of several sample aspects of communication components.
Figure 20:
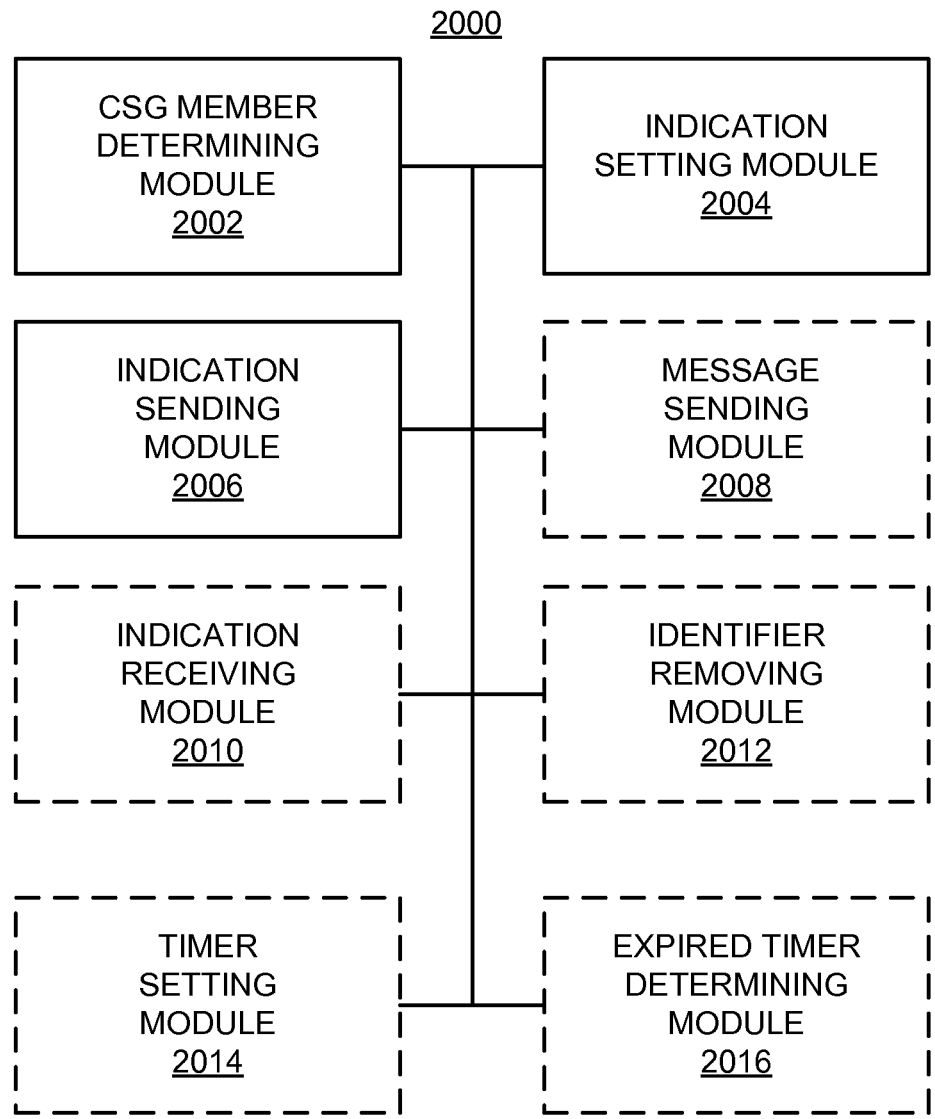
FIGS. 20-27 are simplified block diagrams of several sample aspects of apparatuses configured to provide functionality as taught herein.
Figure 21:
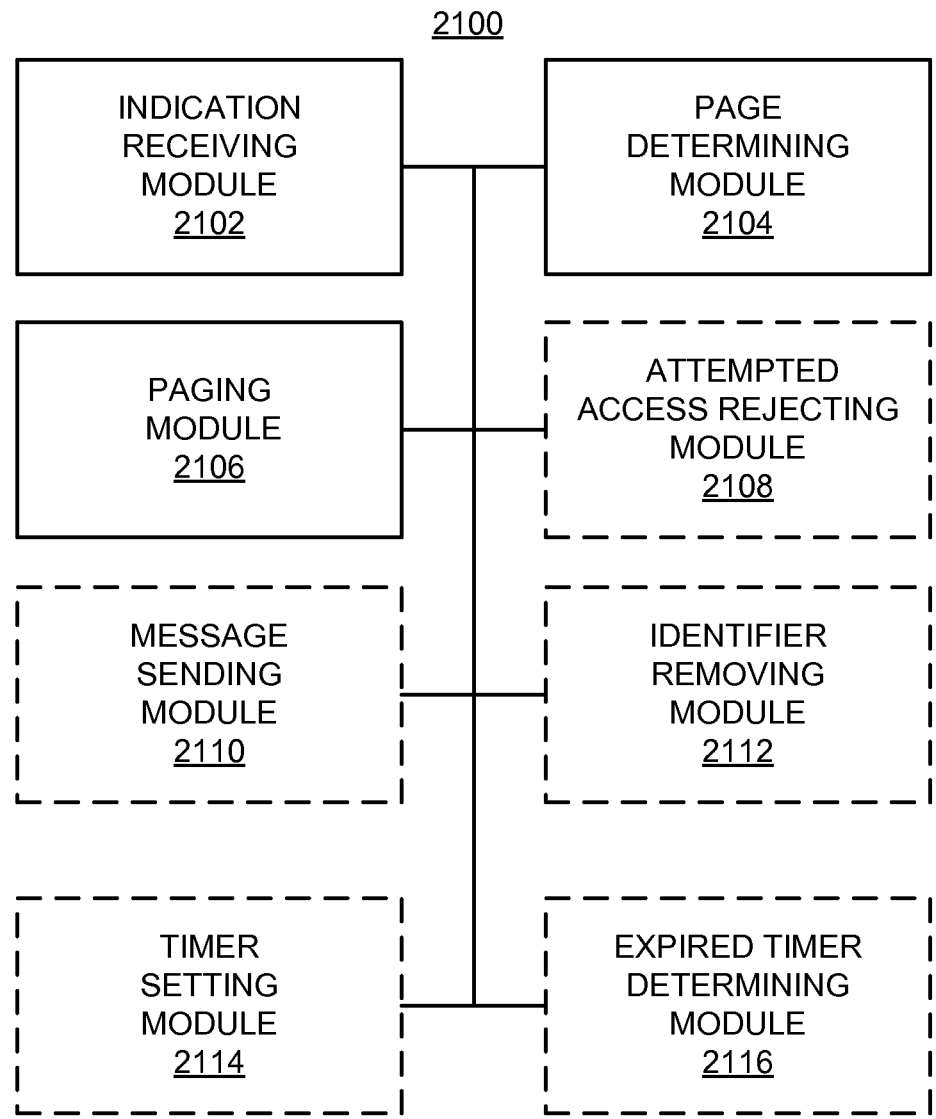
Figure 22:
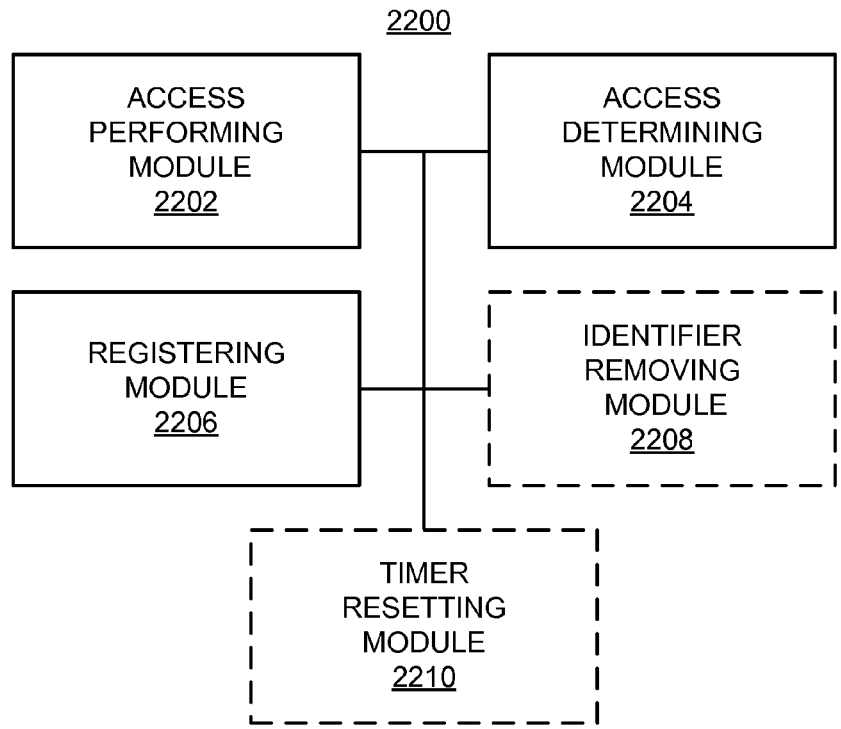
Figure 23:
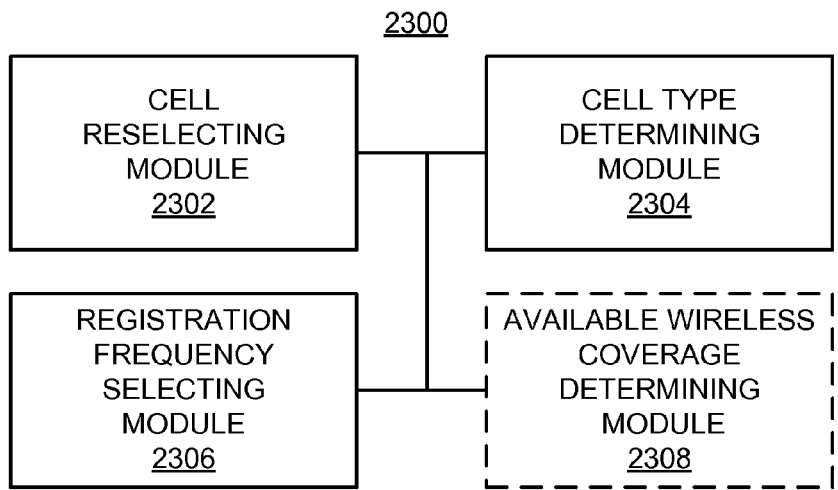
Figure 24:
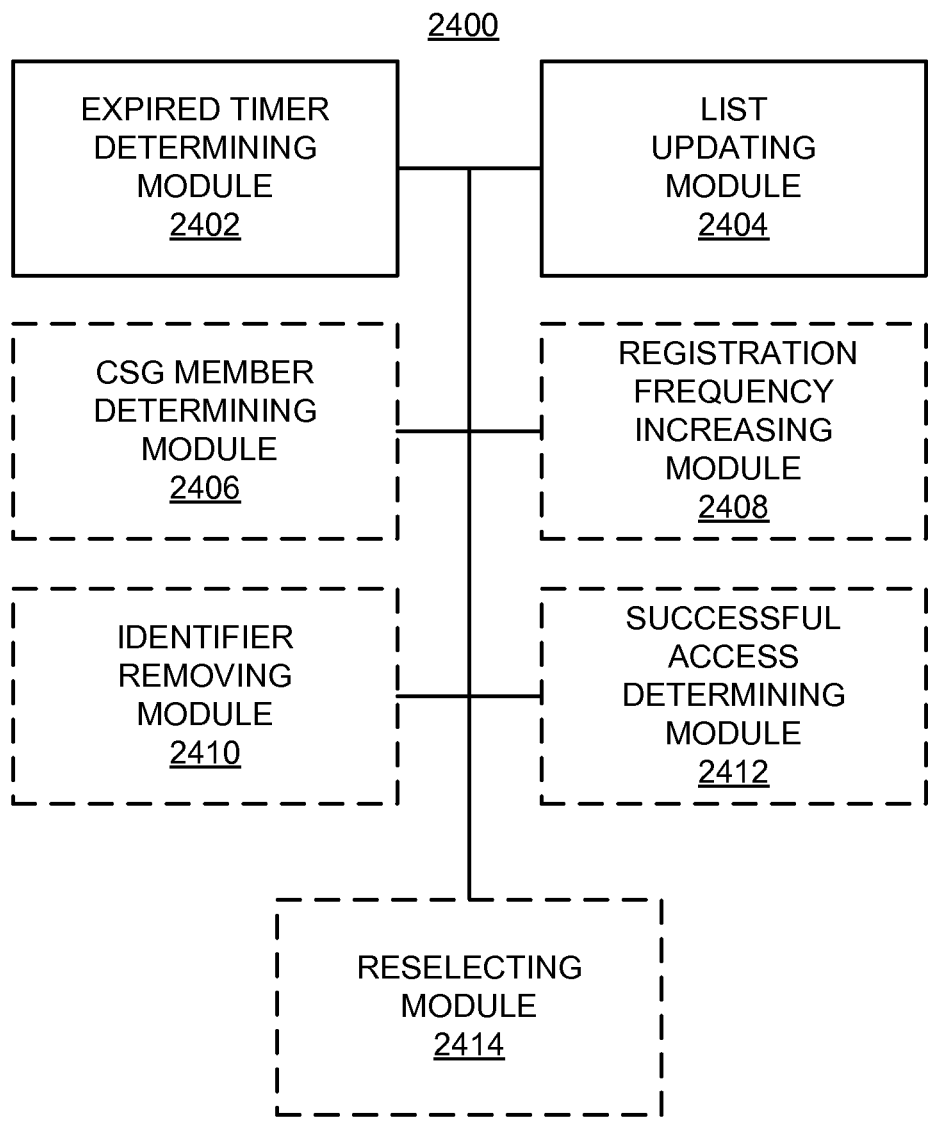
Figure 25:
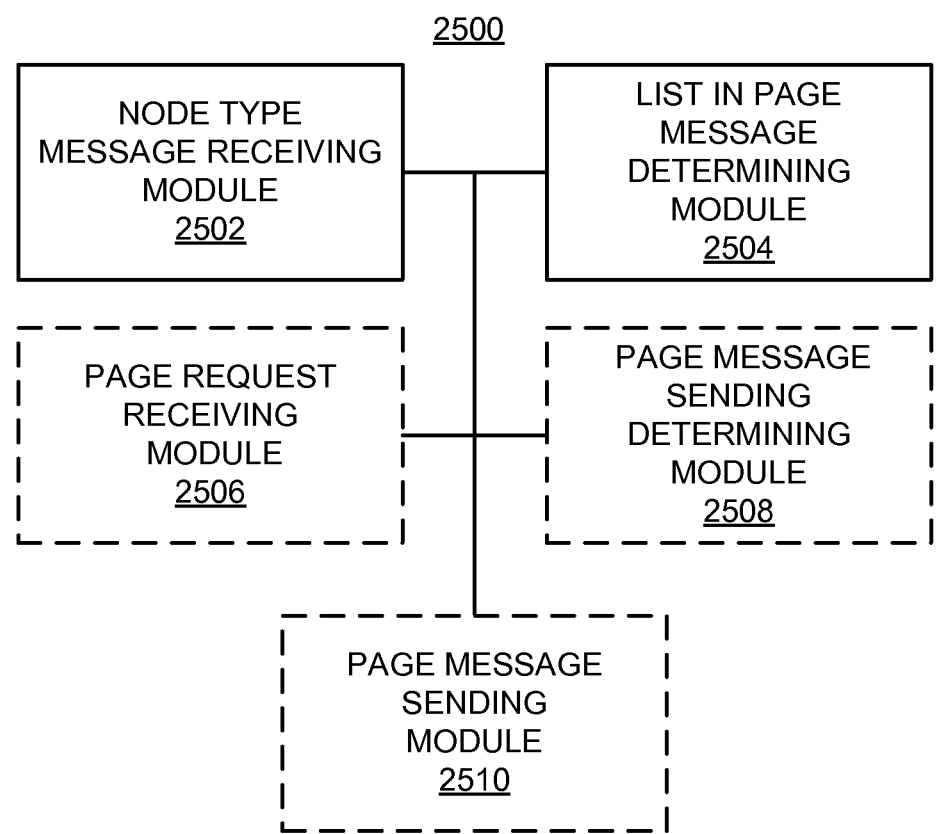
Figure 26:
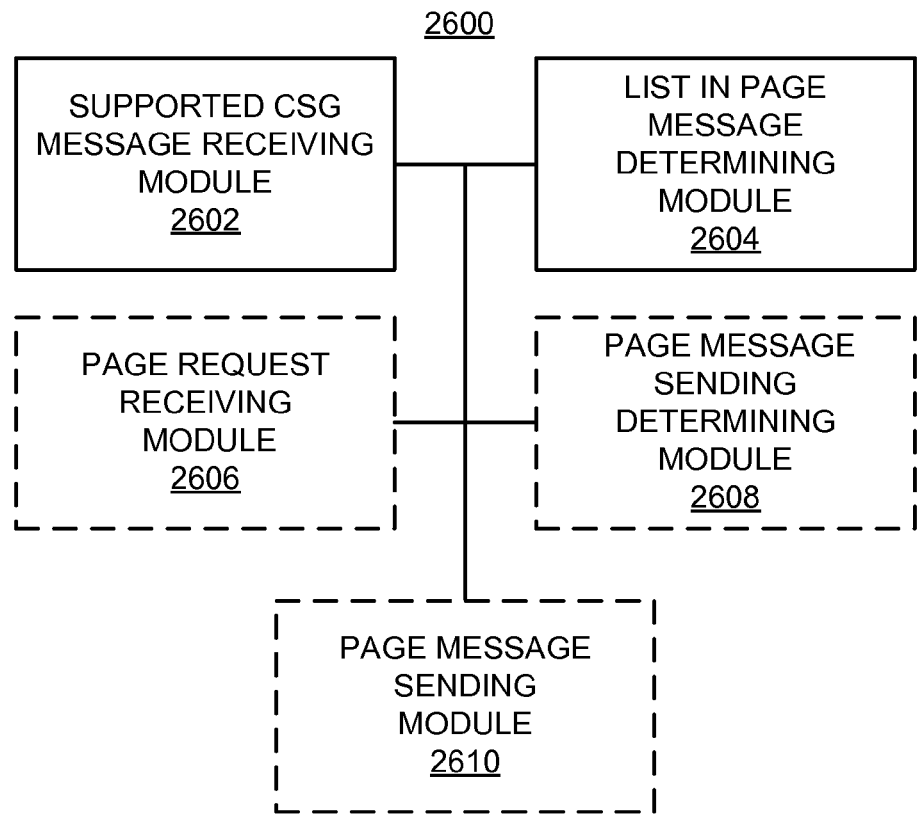
Figure 27:
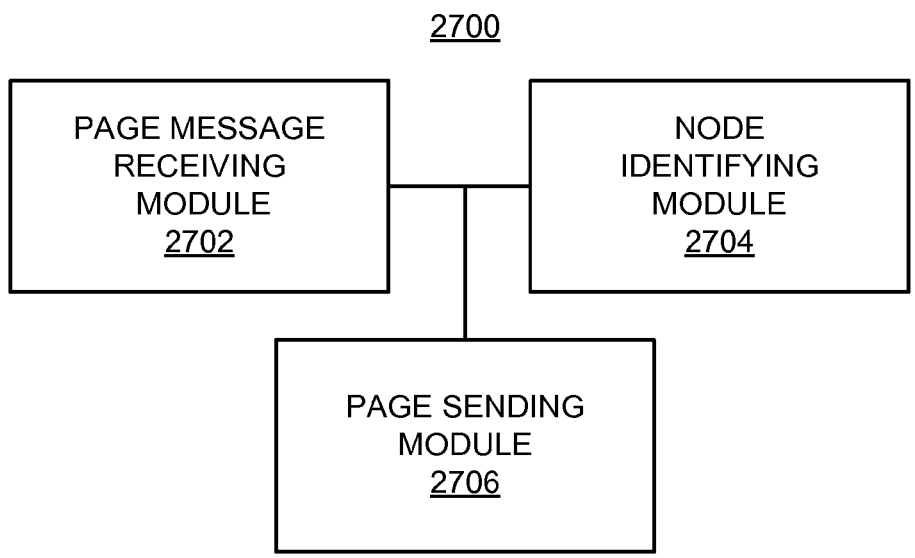

FIG. 19 illustrates a wireless device 1910 (e.g., an access point) and a wireless device 1950 (e.g., an access terminal) of a sample MIMO system 1900. At the device 1910, traffic data for a number of data streams is provided from a data source 1912 to a transmit (TX) data processor 1914. Each data stream may then be transmitted over a respective transmit antenna.

The TX data processor 1914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1930. A data memory 1932 may store program code, data, and other information used by the processor 1930 or other components of the device 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers (XCVR) 1922A through 1922T. In some aspects, the TX MIMO processor 1920 applies beamforming weights to the symbols of the data streams and to the antenna from which the symbol is being transmitted.

Each transceiver 1922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1922A through 1922T are then transmitted from $N_T$ antennas 1924A through 1924T, respectively.

At the device 1950, the transmitted modulated signals are received by $N_R$ antennas 1952A through 1952R and the received signal from each antenna 1952 is provided to a respective transceiver (XCVR) 1954A through 1954R. Each transceiver 1954 conditions (e.g., filters, amplifies, and downconverts) a respective received signal, digitizes the conditioned signal to provide samples, and further processes the samples to provide a corresponding "received" symbol stream.

A receive (RX) data processor 1960 then receives and processes the $N_R$ received symbol streams from $N_R$ transceivers 1954 based on a particular receiver processing technique to provide $N_T$ "detected" symbol streams. The RX data processor 1960 then demodulates, deinterleaves, and decodes each detected symbol stream to recover the traffic data for the data stream. The processing by the RX data processor 1960 is complementary to that performed by the TX MIMO processor 1920 and the TX data processor 1914 at the device 1910.

A processor 1970 periodically determines which pre-coding matrix to use (discussed below). The processor 1970 formulates a reverse link message comprising a matrix index portion and a rank value portion. A data memory 1972 may store program code, data, and other information used by the processor 1970 or other components of the device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954A through 1954R, and transmitted back to the device 1910.

At the device 1910, the modulated signals from the device 1950 are received by the antennas 1924, conditioned by the transceivers 1922, demodulated by a demodulator (DEMOD) 1940, and processed by a RX data processor 1942 to extract the reverse link message transmitted by the device 1950. The processor 1930 then determines which pre-coding matrix to use for determining the beam-forming weights then processes the extracted message.

FIG. 19 also illustrates that the communication components may include one or more components that perform access control operations as taught herein. For example, an access control component 1990 may cooperate with the processor 1930 and/or other components of the device 1910 to enable another device (e.g., device 1950) to access the device 1920 as taught herein. Similarly, an access control component 1992 may cooperate with the processor 1970 and/or other components of the device 1950 to enable the device to access another device (e.g., device 1910). It should be appreciated that for each device 1910 and 1950 the functionality of two or more of the described components may be provided by a single component. For example, a single processing component may provide the functionality of the access control component 1990 and the processor 1930 and a single processing component may provide the functionality of the access control component 1992 and the processor 1970.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2(e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 20-27, apparatuses 2000, 2100, 2200, 2300, 2400, 2500, 2600, and 2700 are represented as a series of interrelated functional modules. Here, a CSG member determining module 2002 may correspond at least in some aspects to, for example, a subscription database as discussed herein. An indication setting module 2004 may correspond at least in some aspects to, for example, a subscription database as discussed herein. An indication sending module 2006 may correspond at least in some aspects to, for example, a communication controller as discussed herein. A message sending module 2008 may correspond at least in some aspects to, for example, a communication controller as discussed herein. An indication receiving module 2010 may correspond at least in some aspects to, for example, a communication controller as discussed herein. An identifier removing module 2012 may correspond at least in some aspects to, for example, a subscription database as discussed herein. A timer setting module 2014 may correspond at least in some aspects to, for example, a subscription database as discussed herein. An expired timer determining module 2016 may correspond at least in some aspects to, for example, a subscription database as discussed herein. An indication receiving module 2102 may correspond at least in some aspects to, for example, a communication controller as discussed herein. A page determining module 2104 may correspond at least in some aspects to, for example, a paging controller as discussed herein. A paging module 2106 may correspond at least in some aspects to, for example, a paging controller as discussed herein. An attempted access rejecting module 2108 may correspond at least in some aspects to, for example, an access controller as discussed herein. A message sending module 2110 may correspond at least in some aspects to, for example, a communication controller as discussed herein. An identifier removing module 2112 may correspond at least in some aspects to, for example, a subscriber data manager as discussed herein. A timer setting module 2114 may correspond at least in some aspects to, for example, a subscriber data manager as discussed herein. An expired timer determining module 2116 may correspond at least in some aspects to, for example, a subscriber data manager as discussed herein. An access performing module 2202 may correspond at least in some aspects to, for example, an access controller as discussed herein. An access determining module 2204 may correspond at least in some aspects to, for example, a timer as discussed herein. A registering module 2206 may correspond at least in some aspects to, for example, a registration controller as discussed herein. An identifier removing module 2208 may correspond at least in some aspects to, for example, a list manager as discussed herein. A timer resetting module 2210 may correspond at least in some aspects to, for example, a registration controller as discussed herein. A cell reselecting module 2302 may correspond at least in some aspects to, for example, a reselection controller as discussed herein. A cell type determining module 2304 may correspond at least in some aspects to, for example, a registration controller as discussed herein. A registration frequency selecting module 2306 may correspond at least in some aspects to, for example, a registration controller as discussed herein. An available wireless coverage determining module 2308 may correspond at least in some aspects to, for example, a wireless coverage detector as discussed herein. An expired timer determining module 2402 may correspond at least in some aspects to, for example, a timer as discussed herein. A list updating module 2404 may correspond at least in some aspects to, for example, a list manager as discussed herein. A CSG member determining module 2406 may correspond at least in some aspects to, for example, a list manager as discussed herein. A registration frequency increasing module 2408 may correspond at least in some aspects to, for example, a registration controller as discussed herein. An identifier removing module 2410 may correspond at least in some aspects to, for example, a list manager as discussed herein. A successful access determining module 2412 may correspond at least in some aspects to, for example, a registration controller as discussed herein. A reselecting module 2414 may correspond at least in some aspects to, for example, a reselection controller as discussed herein. A node type message receiving module 2502 may correspond at least in some aspects to, for example, a communication controller as discussed herein. A list in page message determining module 2504 may correspond at least in some aspects to, for example, a paging controller as discussed herein. A page request receiving module 2506 may correspond at least in some aspects to, for example, a paging controller as discussed herein. A page message sending determining module 2508 may correspond at least in some aspects to, for example, a paging controller as discussed herein. A page message sending module 2510 may correspond at least in some aspects to, for example, a paging controller as discussed herein. A supported CSG message receiving module 2602 may correspond at least in some aspects to, for example, a communication controller as discussed herein. A list in page message determining module 2604 may correspond at least in some aspects to, for example, a paging controller as discussed herein. A page request receiving module 2606 may correspond at least in some aspects to, for example, a paging controller as discussed herein. A page message sending determining module 2608 may correspond at least in some aspects to, for example, a paging controller as discussed herein. A page message sending module 2610 may correspond at least in some aspects to, for example, a paging controller as discussed herein. A page message receiving module 2702 may correspond at least in some aspects to, for example, a communication controller as discussed herein. A node identifying module 2704 may correspond at least in some aspects to, for example, a paging controller as discussed herein. A page sending module 2706 may correspond at least in some aspects to, for example, a paging controller as discussed herein.

The functionality of the modules of FIGS. 20-27 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 20-27 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving a message at a first node to setup communication between the first node and a second node, wherein the first node comprises a mobility management entity, wherein the message indicates a type of the second node, and the type comprises an eNodeB, a home eNodeB, or a home eNodeB gateway; and
   determining, based on the indicated type, whether to include an allowed closed subscriber group list in a page message destined for the second node, wherein the determination comprises not including the allowed closed subscriber group list in the page message if the second node is a home eNodeB.

2. The method of claim 1, wherein the determination comprises including the allowed closed subscriber group list in the page message if the second node is a home eNodeB gateway.

3. The method of claim 1, wherein the message comprises an S1 protocol setup message that includes an indication of the type.

4. The method of claim 1, wherein the message comprises configuration update information.

5. The method of claim 1, further comprising:
receiving a page request message;
determining that the page message is to be sent to the second node based on the page request message; and
sending the page message to the second node.

6. An apparatus for communication, comprising:
a communication controller configured to receive a message at a first node to setup communication between the first node and a second node, wherein the first node comprises a mobility management entity, wherein the message indicates a type of the second node, and the type comprises an eNodeB, a home eNodeB, or a home eNodeB gateway; and
a paging controller configured to determine, based on the indicated type, whether to include an allowed closed subscriber group list in a page message destined for the second node, wherein the determination comprises not including the allowed closed subscriber group list in the page message if the second node is a home eNodeB.

7. The apparatus of claim 6, wherein the determination comprises including the allowed closed subscriber group list in the page message if the second node is a home eNodeB gateway.

8. An apparatus for communication, comprising:
means for receiving a message at a first node to setup communication between the first node and a second node, wherein the first node comprises a mobility management entity, wherein the message indicates a type of the second node, and the type comprises an eNodeB, a home eNodeB, or a home eNodeB gateway; and
means for determining, based on the indicated type, whether to include an allowed closed subscriber group list in a page message destined for the second node, wherein the determination comprises not including the allowed closed subscriber group list in the page message if the second node is a home eNodeB.

9. The apparatus of claim 8, wherein the determination comprises including the allowed closed subscriber group list in the page message if the second node is a home eNodeB gateway.

10. A computer-program product, comprising:
a non-transitory computer-readable medium comprising code for causing a computer to:
receive a message at a first node to setup communication between the first node and a second node, wherein the first node comprises a mobility management entity, wherein the message indicates a type of the second node, and the type comprises an eNodeB, a home eNodeB, or a home eNodeB gateway; and
determine, based on the indicated type, whether to include an allowed closed subscriber group list in a page message destined for the second node, wherein the determination comprises not including the allowed closed subscriber group list in the page message if the second node is a home eNodeB.

11. The computer-program product of claim 10, wherein the determination comprises including the allowed closed subscriber group list in the page message if the second node is a home eNodeB gateway.

* * * * *